(12) United States Patent
Langworthy et al.

(10) Patent No.: US 8,413,119 B2
(45) Date of Patent: Apr. 2, 2013

(54) SEMANTIC SUBTYPING FOR DECLARATIVE DATA SCRIPTING LANGUAGE BY CALLING A PROVER

(75) Inventors: David E. Langworthy, Kirkland, WA (US); Gavin Bierman, Cambridge (GB); Andrew D. Gordon, Cambridge (GB); Donald F. Box, Yarrowpoint, WA (US); Bradford H. Lovering, Seattle, WA (US); Jeffrey C. Schlimmer, Redmond, WA (US); John D. Doty, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1201 days.

(21) Appl. No.: 12/244,988

(22) Filed: Oct. 3, 2008

(65) Prior Publication Data

US 2010/0192129 A1     Jul. 29, 2010

(51) Int. Cl.
*G06F 9/44*          (2006.01)
(52) U.S. Cl. ........................................................ 717/126
(58) Field of Classification Search .................... 717/126
See application file for complete search history.

(56) References Cited

U.S. PATENT DOCUMENTS

| | | | |
|---|---|---|---|
| 6,343,372 B1 | 1/2002 | Felty et al. | |
| 6,714,991 B1* | 3/2004 | Bak et al. | 719/316 |
| 7,120,902 B2 | 10/2006 | Flanagan et al. | |
| 2004/0039718 A1* | 2/2004 | Lumpp et al. | 706/47 |
| 2005/0166193 A1* | 7/2005 | Smith et al. | 717/143 |
| 2006/0195460 A1 | 8/2006 | Nori et al. | |
| 2007/0033440 A1 | 2/2007 | Tillmann et al. | |
| 2007/0226665 A1* | 9/2007 | Ganai et al. | 716/5 |

OTHER PUBLICATIONS

Bouillaguet, "Using First-Order Theorem Provers in the Jahob Data Structure Verification System", 2007, pp. 77-88.*
Knowles, "SAGE: Unified Hybrid Checking for First-Class Types, General Refinement Types, and Dynamic", May 25, 2007).*
Frisch, et al. Semantic Subtyping: Dealing Set-Theoretically with Function, Union, Intersection, and Negation Types. Journal of the ACM, vol. 55, No. 4, Article 19, Publication date: Sep. 2008. Last accessed Oct. 1, 2008, 64 pages.
Calcagno, et al. Deciding Validity in a Spatial Logic for Trees. Technical Report MSR—TR—2002—113, Dec. 2002. Journal of Functional Programming, 15:543-572, 2005. Last accessed Oct. 6, 2008, 39 pages.
Flanagan. Hybrid Type Checking. POPL'06 Jan. 11-13, 2006, Charleston, South Carolina, USA. ACM 1-59593-027-2/06/0001. Last accessed Oct. 1, 2008, 16 pages.
Bierman, et al. Lost in Translation: Formalizing Proposed Extensions to C#. OOPSLA'07, Oct. 21-25, 2007, Montreal, Quebec, Canada. ACM 978-1-59593-786-5/07/0010. Last accessed Oct. 1, 2008, 20 pages.

(Continued)

*Primary Examiner* — Li B Zhen
*Assistant Examiner* — Lenin Paulino
(74) *Attorney, Agent, or Firm* — Chin IP, PLLC; Davin Chin

(57) ABSTRACT

An efficient, logical and expressive type system supports the combination of refinement types and type membership expressions, as well as a top type that encompasses all valid values as members. Various embodiments verify the validity of subtyping relationships by translating to first-order logic, and invoking a general-purpose theorem prover with the first-order logic as input. In contrast to treating formulas as types, types are translated into formulas of standard first-order logic. Moreover, to represent data structures of the programming language as first-order logic, universal and existential quantifiers of first-order logic, and function symbols in terms, are exploited. Data intensive applications can be generated, verified, and deployed with greater speed and scale.

20 Claims, 23 Drawing Sheets

OTHER PUBLICATIONS

Xi, et al. Dependent Types in Practical Programming. In: 26th Annual ACM SIGPLAN-SIGACT Symposium on Principles of Programming Languages, Jan. 1999, San Antonio, Texas. Last accessed Oct. 1, 2008, 14 pages.

Rushby, et al. Subtypes for Specifications: Predicate Subtyping in PVS. IEEE Transactions on Software Engineering, vol. 24, No. 9, Sep. 1998. 0098-5589/98 IEEE. Last accessed Oct. 1, 2008, 12 pages.

De Moura, et al. Z3: An Efficient SMT Solver. MSR Cambridge 2007. In Tools and Algorithms for the Construction and Analysis of Systems (TACAS'08), vol. 4963 of LNCS, pp. 337-340. Springer, 2008. Last accessed.

Rondon, et al. Liquid Types. PLDI'08, Jun. 7-13, 2008, Tucson, Arizona, USA. ACM 978-1-59593-860-2/08/06. Last accessed Oct. 1, 2008, 11 pages.

Freeman, et al. Refinement Types for ML. Proceedings of the ACM SIGPLAN '91 Conference on Programming Language Design and Implementation. Toronto, Ontario, Canada, Jun. 26-28, 1991. Last accessed Oct. 1, 2008, 10 pages.

Benzaken, et al. CDuce: An XMLCentric General-Purpose Language. ICFP'03, Aug. 25-29, 2003, Uppsala, Sweden. ACM 1581137567/03/0008. Last accessed Oct. 1, 2008, 13 pages.

Aiken, et al. Optimal Representations of Polymorphic Types with Subtyping. Report No. UCB/CSD-96-909 Jul. 1996, University of California. Last accessed Oct. 1, 2008, 32 pages.

Horwat. JavaScript 2.0: Evolving a Language for Evolving Systems. Last accessed Oct. 1, 2008, 15 pages.

Castagna, et al. A Gentle Introduction to Semantic Subtyping. ICALP/PPDP—Lisboa, Jul. 2005. Last accessed Oct. 6, 2008, 202 pages.

Damm. Subtyping with Union Types, Intersection Types and Recursive Types II. May 1994. Last accessed Oct. 1, 2008, 26 pages.

Sozeau. Subset Coercions in Coq. Last accessed Oct. 1, 2008, 16 pages.

Meijer, et al. Unifying Tables, Objects and Documents. Last accessed Oct. 1, 2008, 18 pages.

Hosoya, et al. XDuce: A Statically Typed XML Processing Language. Last accessed Oct. 1, 2008, 30 pages.

Bengtson, et al. Refinement Types for Secure Implementations. IEEE 21st Computer Security Foundations Symposium, 2008. Jun. 23-25, 2008, pp. 17-32. 978-0-7695-3182-3/08 IEEE. Last accessed Mar. 24, 2009, 16 pages.

Alagic et al.; Abstract of: "Consistency of Java Transactions"; Retrieved Jul. 2008; 2 pages.

Bonichon et al.; "Zenon: An Extensible Automated Theorem Prover Producing Checkable Proofs"; Retrieved Jul. 2008; 15 pages.

Bouillaguet et al.; "Using First-Order Theorem Provers in the Jahob Data Structure Verification System"; Retrieved Jul. 2008; 15 pages.

Castagna et al.; "Semantic subtyping for the π-calculus"; Proceedings of the 20th Annual Symposium on Logic in Computer Science; IEEE Computer Society; 2005; p. 1-10.

Dezani-Ciancaglini et al.; "The Relevance of Semantic Subtyping"; Electronic Notes in Theoretical Computer Science 70 No. 1; Elsevier Science B.V.; 2002; 18 pages.

Frisch et al.; "Semantic Subtyping"; Proceedings of the 17th Annual IEEE Symposium on Logic in Computer Science; IEEE Computer Society; 2002; pp. 1-10.

Henke et al.; "The TYPELAB Specification and Verification Environment"; Universität Ulm; Ulm, DE; Retrieved Jul. 2008; 4 pages.

* cited by examiner

| ORDER | BAR VALUE |
|---|---|
| 1 | A |
| 2 | B |
| 3 | C |

| ID | BAR VALUE |
|---|---|
| XXX | A |
| YYY | B |
| ZZZ | C |

SEMANTIC SUBTYPING FOR DECLARATIVE DATA SCRIPTING LANGUAGE BY CALLING A PROVER

TECHNICAL FIELD

The subject disclosure generally relates to testing the validity of types of declarative code based on an expressive, compact and flexible type system for a declarative data scripting language, and more particularly, to a semantic subtyping system for testing the validity of subtyping relationships that invokes a prover based on transforms to first-order logic constructs.

BACKGROUND

By way of general background, scripting languages are programming languages that control software systems, applications and programs. Scripts are often treated as distinct from "programs," which execute independently from other applications. In addition, scripts can be distinct from the "core code" of an application, which may be written in a different language. Scripts can be written by developers or other programs, in source formats or object formats, which range the gamut in terms of human friendly or machine friendly, or neither. Where accessible to the end user, scripts enable the behavior of an application to be adapted to the user's needs. Scripts can also be interpreted from source code or "semi-compiled" to bytecode, or another machine friendly format, which is interpreted. Scripting languages can also be embedded in an application with which they are associated.

For further background, a type system defines how a programming language classifies values and expressions into types, how it can manipulate those types and how they interact. A type identifies a value or set of values as having a particular meaning or purpose, although some types, such as abstract types and function types, might not be represented as values in the executing program. Type systems vary significantly between languages, e.g., among other kinds of differences, type systems can vary with their compile-time syntactic and run-time operational implementations.

For an example of how types can be used, a compiler can use the static type of a value to optimize storage and the choice of algorithms for operations on the value. In many C compilers, for example, the nominally typed "float" data type is represented in 32 bits in accordance with an accepted norm for single-precision floating point numbers. C thus uses floating-point-specific operations on those values, e.g., floating-point addition, multiplication, etc. In addition, the depth of type constraints and the manner of their evaluation can have an effect on the typing of the language.

An efficient, logical and expressive type system is desirable to keep language compact, but also highly expressive and logical so that efficient and structurally compact data intensive applications can be generated along with efficient storage representations. However, type systems of conventional programming languages are not general enough or flexible enough for the complexities of massive scale data processing and consumption. In short, any complexity or lack of flexibility of a type system and associated inefficiency can magnify exponentially or out of proportion when large amounts of data are implicated. For the same reasons, the type checking processes that determine whether or not types have been validly specified in programming code have the same limitations of the type systems to which they apply.

In this regard, the ability to express types richly and efficiently, given the diversity of data values in the computing universe, can significantly improve the resulting performance of data intensive applications and programs. A need thus remains for a programming language with an improved type system, along with a way to check that types of the programming language are valid prior to execution with errors. Accordingly, algorithms are desired for type-checking programs in a data scripting language with an expressive type system.

More specifically, the ability to determine the validity of subtype relationships where a programming construct includes a statement that a first type is a subtype of a second type is of particular help for a type system supporting type test and refinement if programs are to be statically verified.

In this regard, a typechecking algorithm often needs to test whether one type S is a subtype of another type T, meaning that any value of the subtype S may be used in a place where the supertype T is expected. A conventional approach is to define a set of syntactic rules for testing subtyping between S and T, i.e., use a subtype algorithm based on the syntax of types. However, this approach is problematic in the context of refinement types, because it is complicated to reflect refinement constraints, which may include logical connectives, such as and, or, negation, and equations as syntactic rules.

One conventional system proposes using a theorem prover to implement semantic subtyping. Such system uses the theorem prover for a propositional spatial logic whose logical connectives are: not, and, zero, composition, guarantee, location, placement, name equality, but with no quantifiers and where the only terms are names. However, this is by no means standard logic, the particular algorithm presented does not scale well and is thus of limited use in practice. There are also some conventional typecheckers that make use of an automated theorem prover during typechecking to check the constraints associated with refinement types, however, again such systems use conventional syntactic rules to determine subtyping, as opposed to using semantic subtyping.

The above-described background information and deficiencies of current type systems and corresponding subtype checking of programming languages are merely intended to provide a general overview of some of the background information and problems of conventional systems, and are not intended to be exhaustive. Other problems with conventional systems and corresponding benefits of the various non-limiting embodiments described herein may become further apparent upon review of the following description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

Various embodiments verify the validity of subtyping programming constructs of a programming language having a type system supporting refinement types and type test expressions. Validity of subtyping relationship is tested by translating to first-order logic, and invoking a general-purpose theorem prover with the first-order logic as input. In contrast to treating formulas as types, types are translated into formulas of standard first-order logic. Moreover, to represent data structures of the programming language as first-order logic, universal and existential quantifiers of first-order logic, and function symbols in terms, are exploited. Translating the subtyping expressions to standard first-order logic enables efficient algorithms for validity, and hence data intensive applications can be generated, verified, and deployed with greater speed and scale.

These and other embodiments are described in more detail below.

BRIEF DESCRIPTION OF THE DRAWINGS

Various non-limiting embodiments are further described with reference to the accompanying drawings in which:

FIG. 20 is an illustration of data storage according to an ordered execution model;

FIG. 21 is a non-limiting illustration of data storage according to an order-independent execution model;

DETAILED DESCRIPTION

Overview

Figure 1:
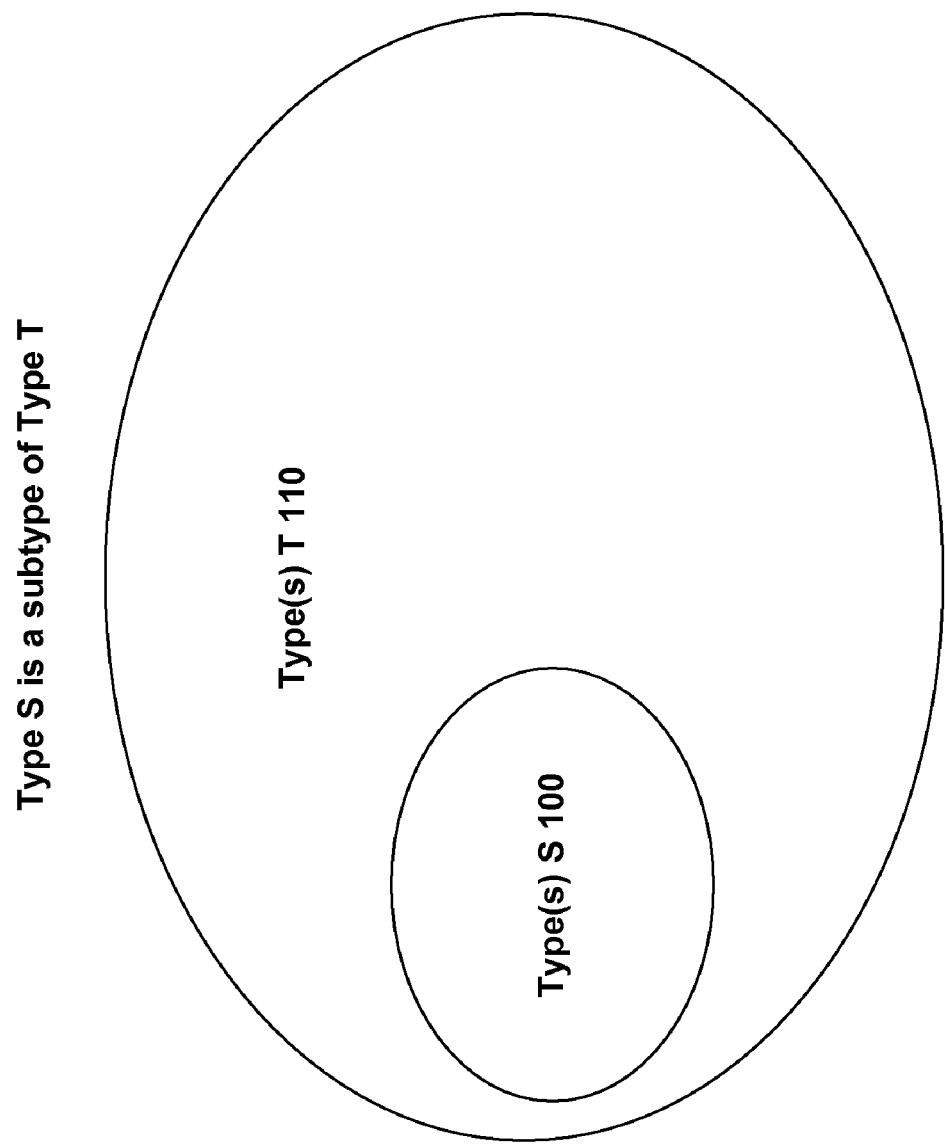
FIG. 1 is a block diagram illustrating a generalized subtyping relationship among two types, a relationship that can be verified using the semantic subtyping and translation to first order logic described herein

As discussed in the background, among other things, conventional type systems have certain complexities and inflexibilities that limit the expressiveness of the resulting programs and limit the efficiency of resulting storage structures and algorithmic processing. Such deficiencies of conventional systems are especially felt when carried out on a large scale, such as in connection with large scale data storage and processing systems. In addition, when interacting with real world data by programs on a data intensive basis, making sure that the types specified in the programs are valid, and thus will match to the target data stores, or certain subsets or columns of a data store without generating errors is beneficial. As a result, e.g., programs having errors can be stopped before they disrupt the computing ecosystem in which they operate.

In this regard, "D" is a programming language developed by Microsoft, is well suited to authoring data intensive programs. The D programming language, more details about which can be found below, is a declarative programming language that is well suited to compact and human understandable representation and advantageously includes efficient constructs for creating and modifying data intensive applications, independent of an underlying storage mechanism, whether flash storage, a relational database, RAM, external drive, network drive, etc. "D" is also sometimes called the "M" programming language, although for consistency, references to M are not used herein.

In various non-limiting embodiments described herein, on top of such an expressive type system, a semantic subtyping algorithm is provided that enables testing of the validity of subtyping relationships by translating the expressions to formulas of first order logic, and invoking a prover with the formulas as input. In this regard, the output of the prover can be used to test the validity of the corresponding subtype relationships, ensuring valid typing of the code. It is noted that the term "subtyping relationship" as used herein refers to whether one type is related to another by the subtype relation.

In one non-limiting aspect, the type system supports the combination of refinement types and type membership expressions. The type system can also include a top type that encompasses all valid values as members. In this regard, the type system of D supports a combination of unique features enabling a synergy of language expressiveness including, but not limited to, the capability of expressing the union and/or intersection of two or more distinct types of a program. The type system and corresponding semantic subtype checking as described herein allows data intensive applications to be statically verified using an expressive type system including subtypes.

As mentioned, in one embodiment, a type system supports the combination of a "top" type (written Any in D), a refinement type (where a type can be qualified by an arbitrary Boolean expression) and the inclusion of a type test expression in the refinement expression language. For the avoidance of doubt, the D programming language is provided as the context for various embodiments set forth herein with respect to the above-mentioned type system and corresponding type checking for a declarative programming model and language. However, it can be appreciated that the various embodiments described herein can be applied to any declarative programming languages having the same or similar capabilities of D with respect to its programming constructs, type system and other defining characteristics.

Thus, for instance, any declarative language including a type system supporting typecasing or type membership expressions in refinement types as set forth in one or more embodiments is contemplated herein, not just embodiments predicated on the D programming language. Moreover, while D is a suitable source of exemplary pseudo-code and conceptual illustration as found herein, such examples are to be considered representative of concepts, and not limited to any particularities of D.

In various embodiments, an efficient, logical and expressive type system and way to validate subtype relationships are provided for flexibly defining and verifying types of a declarative programming language so that efficient, valid and structurally compact data intensive applications can be generated. In one non-limiting aspect, the type system supports the combination of refinement types and type membership expressions. Combined with a top type that encompasses all valid values as members, among other non-limiting aspects, types and sub-types can be efficiently represented for a full range of types of data as may be found in large scale collections of real world data.

On top of the type system, to test the validity of subtypes, i.e., to test whether a first type is a subtype of a second type in a constraint-based type system, a subtyping test translates types into formulas of standard first-order logic, as opposed to treating formulas as types. The universal and existential quantifiers of first-order logic and function symbols in terms are both used to represent data structures of the programming language according to semantic analysis. Once translated, the algorithm relies on the standard semantics of standard first-order logic, and provers based on such logic to test validity of the equivalent first-order logic expressions. Due to the semantic subtyping approach and efficient representation of, and ability to reduce, complex first-order logic expressions, the subtyping algorithms and processes as described herein perform better than the conventional syntactical approaches and have greater applicability than those based on a peculiar logic foundation as described in the background.

In standard logic parlance, various embodiments implement the following. For each type T, a formula $F[T](x)$ is defined that holds if and only if x is a value of type T. To check whether type S is a subtype of type T, the formula $(\forall x.\ F[S](x) \Rightarrow F[T](x))$ is constructed, and a first-order solver is invoked to determine whether the formula is valid, given a suitable background theory.

Invoking a general purpose prover for first-order logic has not been done in this context, and the translation from declarative subtyping programming constructs to formula(e) represented in first-order logic is described in more detail below. Accordingly, various embodiments described herein enable a check if one type is a subtype of another type. The subtyping check can be performed as a subroutine as an overall type checking routine applied to all of the types of declarative code submitted to the checking component. In general, FIG. 1 illustrates a type S 100 that is a subtype of type T 110, a relationship represented by syntax S<:T, since each of the types of type S are also found in type T.

In this regard, to figure out if a subtyping relationship is true, first order predicate logic is used to translate type expressions into logic, which various provers can analyze and help answer whether the subtyping relationship holds. Accordingly, the subtyping problem is translated to formulae, then a set of tools can decide if the first order formulae are valid. In one non-limiting implementation, a Z3 prover designed by Microsoft is used, which is a Satisfiability Modulo Theories (SMT) prover, though any general purpose solver can be used where the solver is given first order predicate logic, and returns, affirmative, negative, or unknown. In this regard, rather than design a complex set of rules including complex algebraic simplification, among other abstractions, into a set of syntactical rules, embodiments set forth in detail below translate the programming constructs to a different formalism, i.e., first order logic, where the subtyping validity is solved. Accordingly, advantageously, various embodiments include translation to first order logic and semantic subtyping.

Figure 2:
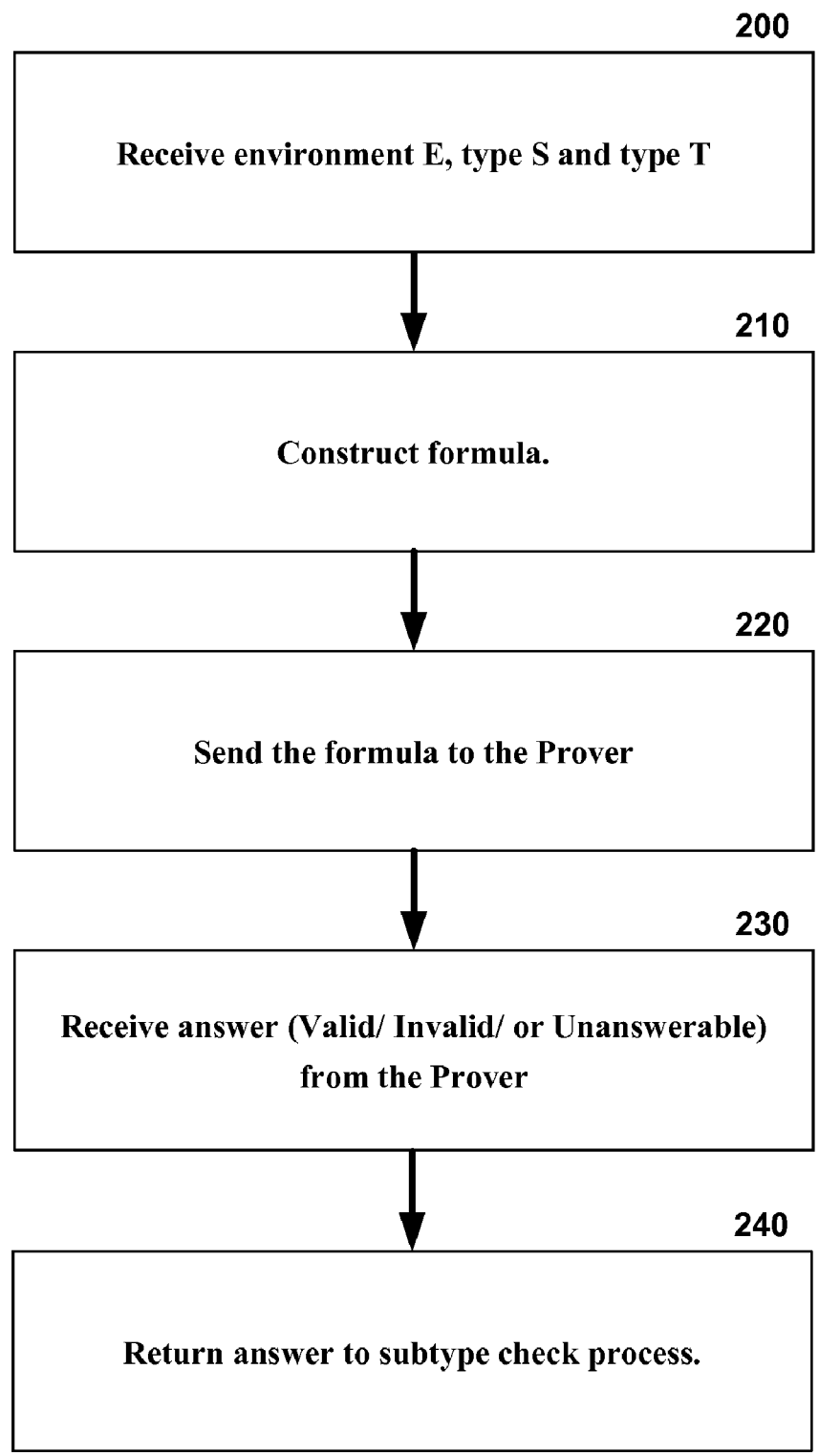
FIG. 2 is a flow diagram of a transformation to first order logic formula in accordance with an embodiment.

FIG. 2 is a flow diagram of an implementation of the algorithm for answering the subtyping question in the first order logic domain through transformation. At 200, a programming construct of a declarative programming language is received having environment E, type S and type T. At 210, the formula $(B \wedge [E]) \Rightarrow (\forall x.F[S](x) \Rightarrow F[T](x))$ is constructed. The formula $(B \wedge [E]) \Rightarrow (\forall x.\ F[S](x) \Rightarrow F[T](x))$ as constructed is then transmitted to the prover at 220. At 230, the prover returns an answer of valid, invalid or unknown (unanswerable), which answer can be used by the type checker at 240 to determine the validity of the statement that type S is a subtype of type T. The formula can be sent together or piecemeal. If sent piecemeal, the answer from the prover can be aggregated to provide the same answer as if the pieces were processed together. In addition, if the prover returns an unknown, another prover can be used, or multiple provers can be used in parallel in substitution of any embodiment only having one prover to reinforce the validity of the subtyping validity determination. Additional, non-limiting details are presented below.

Semantic Subtyping with Type Test and Refinement

As discussed above, conventional type systems of programming languages have not enabled type checking expressions in refinement type statements as part of the associated type system. Accordingly, for such a system, various embodiments type check types found in programs constructed according the type system of the D programming language, or similar type system, which supports rich and expressive features. In various embodiments, semantic subtyping is enabled for checking subtypes in a data scripting language.

Figure 3:
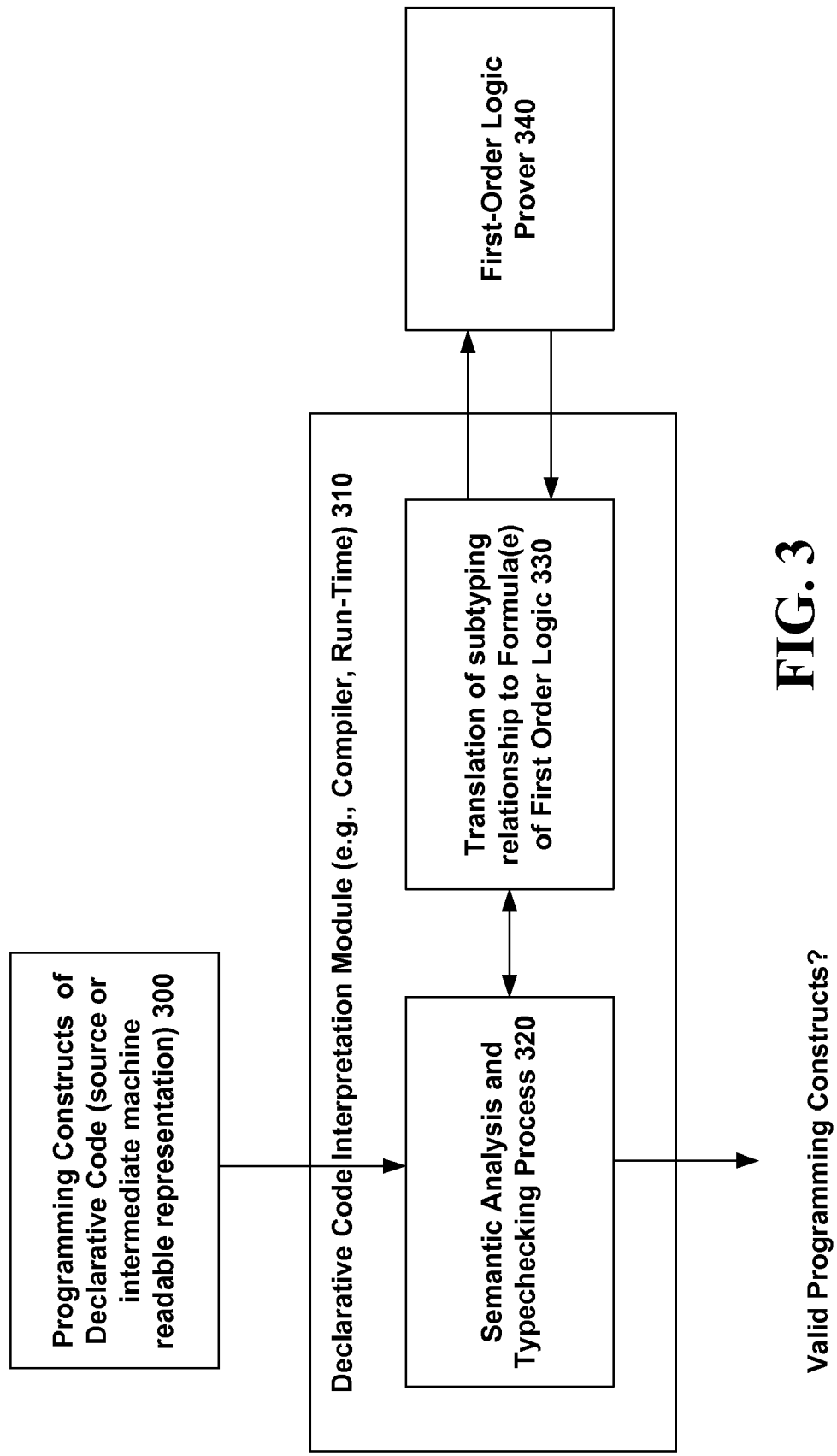
FIG. 3 is a block diagram of a declarative code interpretation module according to various embodiments for checking subtype relationships in declarative code.

FIG. 3 is a generalized block diagram of an embodiment illustrating an exemplary non-limiting mechanism for checking subtypes of a D program with programming constructs 300. In this regard, an interpretive module 310 performs a semantic analysis as part of a general type checking process 320 that includes type checking subtypes. In this regard, for subtype relationships, a translation occurs to formulae of first order logic 330 as described in detail below. As described, the first order logic formulae 330 are then passed to a prover, which then returns an answer of valid, invalid, or unknown, which is then used to indicate the validity of the subtyping relationship being validated by the module 310.

Figure 4:
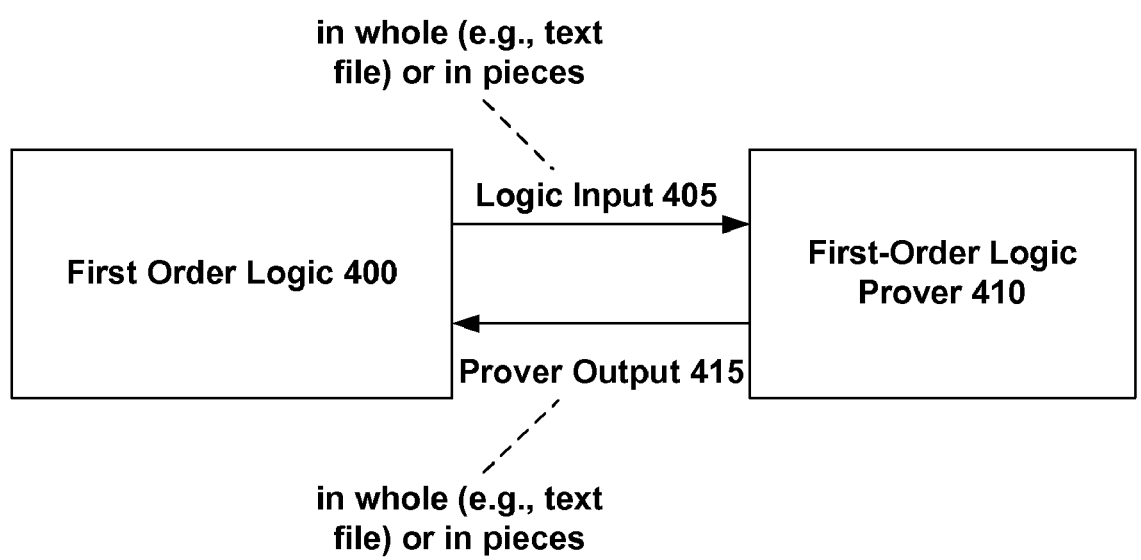
FIG. 4 is a block diagram illustrating some alternative embodiments for communicating with a prover regarding the first order logic constructs.

FIG. 4 takes FIG. 3 one step further by focusing on the idea that the prover 410 is separable from the module 400 that translates the subtyping relationships to first order logic. In this regard, the logic input 405 into first order logic prover 410 can be divided into pieces, and then the output 415 can be aggregated and evaluated together having the same effect as if all of the logic input 405 were input in whole, or together.

Figure 5:
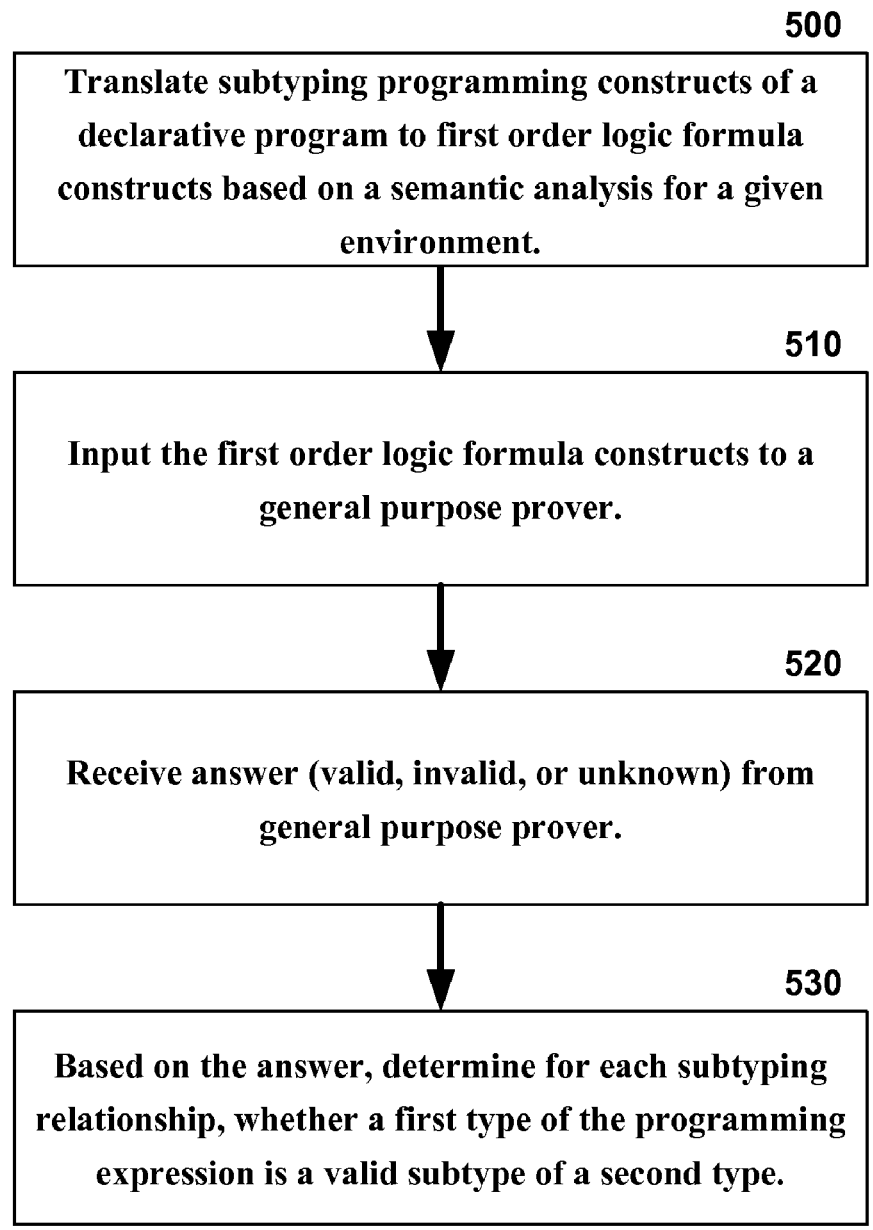
FIG. 5 is a flow diagram of a first method of checking subtype relationships in accordance with an embodiment.

FIG. 5 is a flow diagram of a first method of checking subtype relationships in accordance with an embodiment. At 500, subtyping programming constructs of a declarative program are translated to first order logic formula constructs based on a semantic analysis for a given environment. At 510, the first order logic formula constructs are input to a general purpose prover. At 520, an answer (valid, invalid, or unknown) is received from a general purpose prover. Based on the answer, at 540, for each subtyping relationship, it is determined whether a first type of the programming expression is a valid subtype of a second type.

Figure 6:
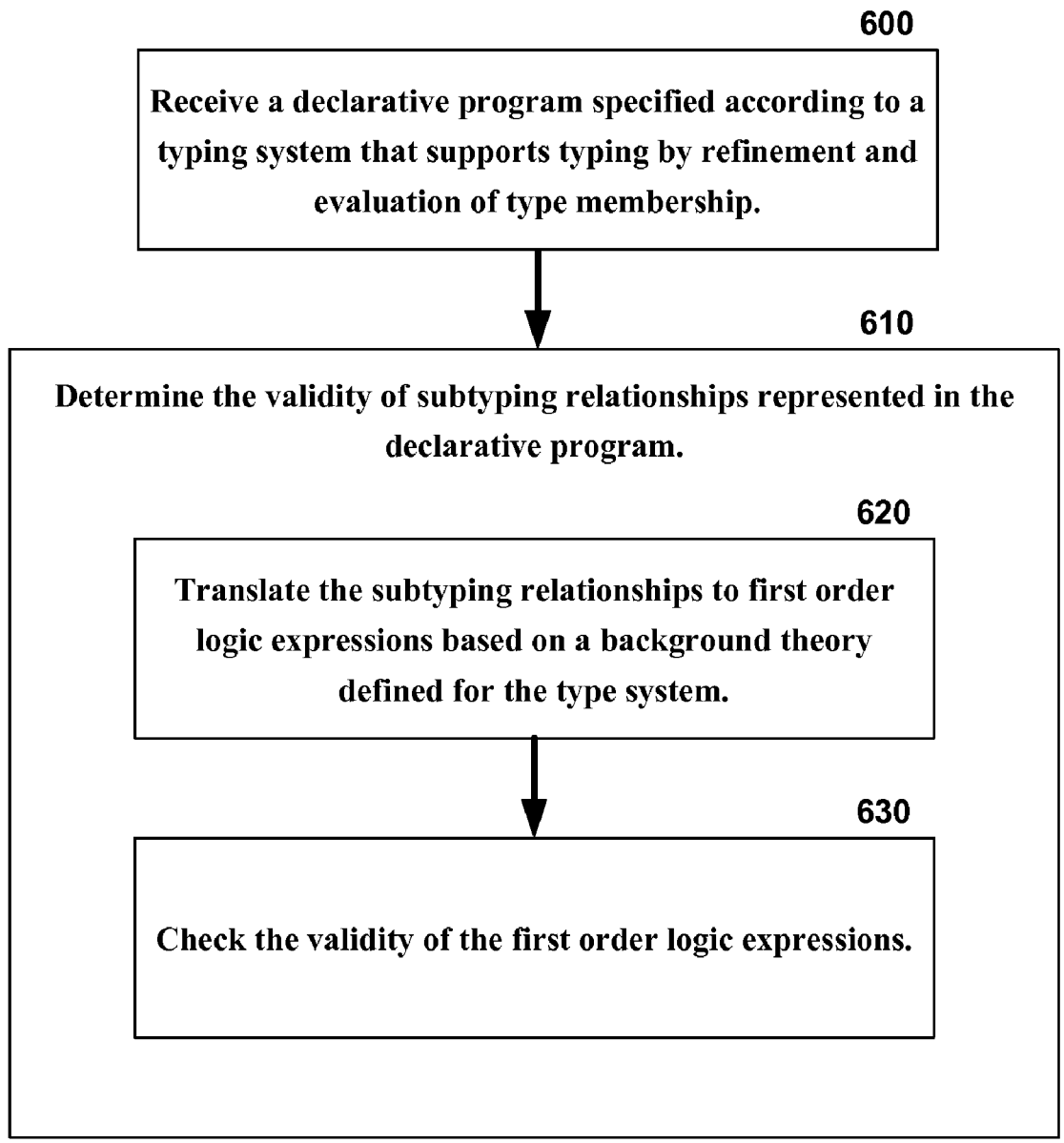
FIG. 6 is another flow diagram of a method for checking subtype relationships as set forth herein.

FIG. 6 is another flow diagram of a method for checking subtype relationships as set forth herein. At 600, a declarative program is received specified according to a type system that supports typing by refinement and evaluation of type membership. At 610, the validity of subtyping relationships represented in the declarative program is determined by calling a subtyping validity check subroutine. At 620, the subtyping relationships are translated to first order logic expressions based on a background theory defined for the type system. Lastly, at 630, the validity of the first order logic expressions is checked based on an analysis of the first order logic expressions.

As mentioned, various embodiments discussed herein determine whether a type S is a subtype of a type T, given an environment E, assigning types to all the variables occurring in the types S and T.

More formally, let E range over typing environments, which are association lists $x_1:T_1, \ldots, x_n:T_n$ that associate a type $T_i$ with each variable $x_i$ in scope, where the variables $x_i$ are pairwise distinct. There are many concrete representations of this abstraction.

A function T[e] is defined that takes as input an expression e of the programming language and yields a logical term T[e] that represents the semantics of e. The detailed definition of this function is mathematically described below.

A function F[T](t) is also defined that takes as input a type T of the programming language and a logical term t, and yields a logical formula F[T](t) that represents the semantics of T as a predicate on the term t. The detailed definition of this function is also mathematically described below.

Further, a function F[E] is defined that takes as input a typing environment E and yields a formula representing the semantics of the environment; if $E=x_1:T_1, \ldots, x_n:T_n$, then F[E] is the formula $F[T_1](x_1) \wedge . \wedge F[T_n](x_n)$.

A background theory, a formula B, can be assumed that includes formulas defining properties of the predicate and function symbols used in the semantics of expressions and types.

A Prover implements a theorem proving algorithm for first-order logic (or an extension), that will determine whether a formula is valid given the background theory B; it may also terminate indicating the formula is invalid, or it may loop, as the problem is undecidable. The background theory is part of the state of the Prover; formulas can be added or removed from the background theory while the Prover executes.

Some of the background theory can also be built into the Prover as standard, e.g., a theory of arithmetic, and some can be provided by the typechecking algorithm, e.g., the functions T[e] and F[T](t) may define new predicate and function symbols and may augment the background theory with formulas concerning the new symbols.

Given E, to determine whether S is a subtype of T, as mentioned, the formula $(B \wedge [E]) \Rightarrow (\forall x. F[S](x) \Rightarrow F[T](x))$ is constructed, and the Prover is invoked to determine whether the formula is valid. If the Prover says the formula is valid, then it is known that S is a subtype of T. If the Prover says it is not valid, then S is not a subtype of T. If the Prover loops, or terminates saying it does not know, then the subtyping question is unknown, and another prover can be tried, or another pre-defined action taken.

In addition, the Prover may be invoked programmatically by directly calling its API, or by constructing a text file containing some or all of the formula and running the Prover on the file.

There are several logically equivalent methods of sending the formula $(B \wedge [E]) \Rightarrow (\forall x. F[S](x) \Rightarrow F[T](x))$ to the Prover. For example, the formula may be constructed in one piece and sent to the Prover, or equivalently it may be constructed in separate pieces with each piece being sent separately, as illustrated in FIG. 4. For example, the pieces B and [E] may be sent to the prover, and then given this background theory we ask whether $(\forall x. F[S](x) \Rightarrow F[T](x))$ is valid.

Alternatively, if it is ensured that variable x does not occur free in B and [E], the pieces B and [E] and F[S](x) can be sent to the Prover, and then it can be asked whether F[T](x) is valid. In all these cases, it may be that some or all of B may be built into the Prover, so that only the unknown part need be sent for efficiency. Exemplary non-limiting Provers that can be used to process the first order logic formulae include Z3, Simplify, Spass, Otter, and Vampire.

There are several different syntaxes that may be used for the formula. These syntaxes include the S-expression-based format of the DEC/HP Simplify theorem prover, the syntax of the SMT-Lib benchmarks, and the native syntax of the Microsoft Z3 theorem prover. A goal of SMT-LIB is to establish a library of benchmarks for Satisfiability Modulo Theories, that is, satisfiability of formulas with respect to background theories for which specialized decision procedures exist—such as, for instance, the theory of lists, of arrays, linear arithmetic, and so on. Systems for satisfiability modulo theories have applications in formal verification, compiler optimization, and scheduling, among others.

However, in accordance with the embodiments herein, the translation of programming constructs targets first-order logic, but since higher-order logics typically include first-order logic, the algorithm can also be used when the Prover is in fact a theorem prover for a higher-order logic.

Below, a core calculus is explored for describing the semantics of expressions and types in D. The following describes a formal calculus as a basis for the type system of D. The formal calculus is an assembly of standard constructions from type theory. In this regard, in various embodiments, a type system is provided for a programming language that features combined support for refinement types and type test expressions, wherein semantic subtyping is achieved by calling an SMT solver.

SMT solvers decide logical satisfiability (or dually, validity) of formulas in classical multi-sorted first-order logic with equality, with respect to a background theory. The success of SMT for program analysis and verification is largely due to the suitability of supported background theories. These theories include: arithmetic; uninterpreted functions; recursive data-types; and theories of program structures such as machine arithmetic (bit-vectors), arrays, and heaps. SMT solvers play a central role in several program analysis and runtime tools.

With respect to collections, entities, and scalars, the following example illustrates some features of the language. A comprehension is used to scan over a collection of integers to produce a collection of entities, each consisting of an integer coupled with a logical flag.

```
(from n in { 5, 4, 1, 0, 4, 6, 7, 10}
 where n < 5
 select {Num=n, Flag=(n>0)}
) : {Num:Integer; Flag:Logical;}*
```

The following example illustrates how a nullable version of a type T can be defined, as the union of T with the singleton type containing only the value null

```
type
    Null = (Any where value==null);
    NullableInt = Integer || Null
from x in ({ null, 42 } : NullableInt*)
where x!=null
select (x:Integer)
```

The comprehension removes nulls from its input collection. Given that x:NullableInt, and the check that x!=null, the typechecker can establish that x:Int. If the check that x!=null is removed, typechecking fails.

With respect to refinement types, the following example illustrates how subtypes of Integer can be defined.

```
let x = (4 : (Integer where value < 5)) in
let y = (6 : (Integer where value < 7)) in
    x+y : (Integer where value < 11)
```

The typechecker can establish that the sum x+y must be less than 11. If imposing a lower bound is attempted, typechecking fails, as expected.

The following example illustrates dependent typechecking:

```
type S = { tag:[true]; foo:Integer; };
     T = { tag:[false]; bar:Text; }
let xs : (S || T)__=
    { { tag=true, foo=42 }, { tag=false, bar="freddy"} }
in
    from x in xs
    select ( x.tag ? "Hello" : x.bar ) : Text
```

The following example illustrates using type test to process semistructured data, with the middle field being optional.

```
type T = {a:Integer;} && (Any || {b:Text;}) && {c:Logical;}
let ts:T* = { {a=42, c=true}, {a=42, b="Freddy", c=true}} in
from t in ts
where t in {b:Text;}
select (t.b : Text)
```

The following Table I illustrates the syntax of values and expressions.

TABLE I

| Syntax of Values and Expressions | |
|---|---|
| Syntax | Use |
| x | Variable |
| $\ell$ | Field |

TABLE I-continued

| Syntax of Values and Expressions | |
|---|---|
| Syntax | Use |
| $i$ | Integer |
| $s$ | String |
| c | literals (Booleans, integers, strings) |
| $\oplus$ | operator (+, −, <, ==, !, &&, \|\|, Count) |
| v::= | Value |
| c | literal |
| $\{v_1,...,v_n\}$ | collection (unordered) |
| $\{\ell = v_i{}^{i \in 1..n}\}$ | entity (unordered, $\ell_i$ distinct) |
| e::= | expression |
| x | variable |
| c | literal |
| null | null |
| $\oplus(e_1,...,e_n)$ | operator application |
| $e_1?e_2:e_3$ | conditional |
| let x = $e_1$ in $e_2$ | let-expression |
| e in T | type test |
| e:T | type annotation |
| $\{\ell_i = e_i{}^{i \in 1..n}\}$ | entity |
| e.$\ell$ | field selection |
| { } | empty collection |
| {e} | unit collection |
| $e_1 + e_2$ | collection union |
| bind x ← $e_1$ in $e_2$ | bind-expression |

A finite, global set of type definitions can be assumed, each of which associates a type expression with a distinct type variable. type X=T is written to mean that T is associated with X. The variable X itself may occur in T. It can be assumed there are no free occurrences of value variables in T. In the following, it can be assumed that expressions are type checked in the context of a set of type definitions of the following form.

type X=T

The body of each definition may mention any of the defined type names, and may be recursive. In this regard, a global map, typedef, that maps type names to types is assumed, for example, given the above definition, then typedef(X)=T. The syntax of types is set forth in Table II below.

TABLE II

| Syntax of Types | |
|---|---|
| Syntax of Types: | |
| S,T,U ::= | Type |
| X | type variable (with definition type X = T) |
| Any | the top type |
| Integer | integer |
| Text | string |
| Logical | truth values |
| T* | collection type |
| $\{\ell:T\}$ | (single) entity type |
| $\{x:T \mid e\}$ | refinement type |

The informal semantics consists of interdependent evaluation and inhabitation relations: that an expression evaluates to a value, and that a value inhabits a type. The expression evaluations are set forth below in the following bulleted list.

To evaluate c return c.

To evaluate $\oplus(e_1, \ldots e_n)$, evaluate each $e_i$ to a value $v_i$, and return the outcome of combining the values $v_1$, $v_n$ with the operator $\oplus$.

To evaluate $e_1?e_2:e_3$, first evaluate $e_1$. If its value is true evaluate $e_2$. If its value of false evaluate $e_3$. Any other value for $e_1$ is an error.

To evaluate let $x=e_1$ in $e_2$, evaluate $e_1$ to yield a value $v_1$, and evaluate $e_2\{v_1/x\}$.

To evaluate e in T, evaluate e to a value v, return true or false depending on whether or not v inhabits T.

To evaluate e:T, return the result of evaluating e.

To evaluate $\{\ell_i = e_i^{i \in 1 \ldots n}\}$, evaluate each $e_i$ to yield a value $v_i$, and return $\{\ell_i = v_i^{i \in 1 \ldots n}\}$.

To evaluate e.$\ell$, evaluate e to yield an entity $\{\ell = v_i^{i \in 1 \ldots n}\}$; if $\ell = \ell_j$ for some $j \in 1 \ldots n$, return $v_j$.

To evaluate $\{\}$, return $\{\}$.

To evaluate $\{e\}$, evaluate e to yield a value v, and return $\{v\}$.

To evaluate $e_1 + e_2$, evaluate each $e_i$ to a collection $v_i$, and return the concatenation of $v_1$ and $v_2$.

To evaluate bind $x \leftarrow e_1$ in $e_2$, evaluate $e_1$ to yield a collection $\{v_1, \ldots, v_n\}$, then evaluate the expression $e_2\{v_1/x\} + \ldots + e_2\{v_n/x\} + \{/\}$.

Type inhabitation principles are also illustrated with respect to the bulleted list below.

- A value of type X is is any syntactically well-formed value v that is a value of type T, where type X=T.
- A value of type Any is any syntactically well-formed value v.
- A value of type Integer is an integer literal c=i.
- A value of type Text is a string literal c=s.
- A value of type Logical is Boolean literal, either c=true or c=false.
- A value of type T* is a collection $\{v_1, \ldots, v_n\}$ such that each $v_i$ is a value of type T.
- A value of type $\{\ell T\}$ is an entity $\{\ell = v_i^{i \in 1 \ldots n}\}$ such that $\ell = \ell_j$ for some $j \in 1 \ldots n$, and value $v_j$ is of type T.
- A value of type $\{x:T\ e\}$ is a value v of type T such that the expression $e\{v/x\}$ evaluates to true.

Union and intersection types can be derived from logical disjunction and conjunction. Moreover, Boolean operators are derivable from conditional expressions.

The following are derived types that are possible with the rich, expressive language.

$T \mid U \triangleq \{x:\text{Any}|(x \text{ in } T)\|(x \text{ in } U)\}$ $T \& U \triangleq \{x:\text{Any}| (x \text{ in } T) \& (x \text{ in } U)\}$ $\text{Null} \triangleq \{x:\text{Any} \mid x == \text{null}\}$ $\text{General} \triangleq \text{Integer}|\text{Text}|\text{Logical} \mid \text{Null}$ $T? \triangleq T \mid \text{Null}$ $[e] \triangleq \{x:\text{Any}\ x == e\}$ $\{\ell_i:T_i;^{i \in 1 \ldots n}\} \triangleq \begin{cases} \text{Any} & \text{if } n = 0 \\ \#3 & \text{otherwise} \end{cases}$ $\text{Empty} \triangleq \{x:\text{Any} \mid x\ !=\ x\}$ The following represent some example types.

Category={Name: Any;Description: Any;}
Category2={Name: Text;Description: Text;}
Named={Name: Text;}
Ranked={Rank: Integer;}
Soldier={Name: Text;Rank: Integer; SerialNumber: Text;}
NonNegativeInteger={x:Integer|x≧0}

With respect to syntax of the logic, to obtain a formal semantics for expressions, consider untyped first-order logic with equality.

Let t range over terms, and F, G, range over formulas.
vld(F) is written to mean that the formula F is valid.
List syntax $[t_1; \ldots ;t_n]$ and pair syntax $(t_1,t_2)$ are used.
$\lambda x.t$ are written for a term such that $\forall y.\text{apply}(\lambda x.t, y)=t\{y/x\}$.

With respect to translation of expressions and types, the logical semantics include two functions:

For any expression e, we construct a logic term T[[e]].

For any type T and logic term t, we construct a logic formula F[[T]](t).

Since each value v is an expression, term T[[v]] represents the semantics of v. The semantics of expressions amd types are set forth below in Table III and IV, respectively.

TABLE III

Semantics of Expressions
Semantics of Expressions: term T[[e]]

term(F) = (if F then $v_t$t else $v_f$f)
T[[x]] = x
T[[true]] = v__tt
T[[false]] = v__ff
T[[i]] = v__int(i)
T[[s]] = v__text(s)
T[[null]] = v__null
T[[+($e_1,e_2$)]] = v__plus(T[[$e_1$]],T[[$e_2$]])
T[[-($e_1,e_2$)]] = v__minus(T[[$e_1$]],T[[$e_2$]])
T[[<($e_1,e_2$)]] = v__lt(T[[$e_1$]],T[[$e_2$]])
T[[== ($e_1,e_2$)]] = term(T[[$e_1$]] = T[[$e_2$]])
T[[!(e)]] = term(T[[e]] = T[[false]])
T[[&& ($e_1,e_2$)]] = term(T[[$e_1$]] = T[[true]]∧T[[$e_2$]] = T[[true]])
T[[|| ($e_1,e_2$)]] = term(T[[$e_1$]] = T[[true]]∨T[[$e_2$]] = T[[true]])
T[[Count(e)]] = v__len(T[[e]])
T[[$e_1$?$e_2$ : $e_3$]] = (if T[[$e_1$]] = T[[true]] then T[[$e_2$]] else T[[$e_3$]])
T[[let x = $e_1$ in $e_2$]] = let x = T[[$e_1$]] in T[[$e_2$]]
T[[e in T]] = term(F[[T]](T[[e]]))
T[[e:T]] = T[[e]]
T[[ $\{\ell_i = e_i^{i \in 1..n}\}$ ]] = E([($\ell_1$,T[[$e_1$]]);...;($\ell_n$,T[[$e_n$]])])
T[[$e^\ell$]] = dot(T[[e]],$\ell$)
T[[ { } ]] = C([ ])
T[[ {e} ]] = C([T[[e]]])
T[[$e_1 + e_2$]] = plus(T[[$e_1$]],T[[$e_2$]])
T[[bind x ← $e_1$ in $e_2$]] = v__join(v__map($\lambda$x.T[[$e_2$]],T[[$e_1$]]))

TABLE IV

Semantics of Types
Semantics of Types: formula F[[T]](t)

F[[X]](t) = $p_X$(t)
F[[Any]](t) = Value(t)
F[[Integer]](t) = In__Integer(t)
F[[Text]](t) = In__Text(t)
F[[Logical]](t) = In__Logical(t)
F[[T*]](t) = Is__C(t)∧($\forall$x.v__mem(x,t)⇒F[[T]](x))  x∉fv(T,t)
F[[ $\{\ell:T\}$ ]](t) = Is__E(t)∧F[[T]](dot(t,$\ell$))
F[[ {x:T | e} ]](t) = let x = t in (F[[T]](t)∧T[[e]] = T[[true]]))
x∉fv(T,t)

A background theory, a conjunction B, can be assumed that:

1. includes conjuncts defining properties of the fixed predicate and function symbols used in the semantics of expressions and types (including arithmetic);

2. includes a conjunct $\forall x.p_x(x) \Leftrightarrow F[[T]](x)$ for each type definition type X=T;

3. includes a constant definition for each $\lambda x.t$ used in the semantics.

$\text{vld}_B(F)$ is written to mean that formula F is valid given the background theory B, that is, vld(B=>F).

In addition, the following proposition applies:

1. For all closed expressions e and values v, e evaluates to v if and only if $\text{vld}_B(T[[e]]=T[[v]])$.

2. For all closed T and v, value v inhabits type T if and only if $vld_B(F[\![T]\!](T[\![v]\!]))$.

With respect to judgments of the type system, the following applies to the syntax and semantics of typing environments:

$E ::= x_1:T_1, \ldots, x_n:T_n$ (ordered) environment

The notation $\emptyset$ is used for the empty environment.

$$dom(x_1: T_1, \ldots, x_n: T_n) = \{x_1, \ldots, x_n\}$$

$$F[\![x_1: T_1, \ldots, x_n:T_n]\!] \triangleq F[\![T_1]\!](x_1) \wedge \ldots \wedge F[\![T_n]\!](x_n)$$

$$F[\![\emptyset]\!] \triangleq \text{True}$$

Judgments of the type system are set forth in Table V below:

TABLE V

Judgments of the Type System
Judgments of the Type System:

| | |
|---|---|
| $E \vdash \diamond$ | environment E is wellformed |
| $\Gamma \vdash e <: T$ | in E, S is a subtype of type T |
| $\Gamma \vdash e \rightarrow T$ | in E, expression e synthesizes type T |
| $\Gamma \vdash e \leftarrow T$ | in E, expression e checks against type T |

For some additional background, the relations $\Gamma \vdash e \rightarrow T$ and $\Gamma \vdash e \leftarrow T$ represent a bidirectional type system. The rules for $\Gamma \vdash e \rightarrow T$ amount to an algorithm that can be informally read "in context E the expression e synthesis the type T". The rules for $\Gamma \vdash e \leftarrow T$ amount to an algorithm that can be informally read "in context E, the e can be typechecked at type T".

For wellformed Environments, the following judgment applies:

(Env Empty)   (Env Item)

$$\overline{E \vdash \diamond}$$

$$\frac{E \vdash \diamond x \notin dom(E) fv(T) \subseteq dom(E)}{E, x: T \vdash \diamond}$$

$$E \vdash \diamond x \notin dom(E) fv(T) \subseteq dom(E)$$

For subtyping, the following judgment can be expressed:

(Subtype)

$$\frac{E \vdash \diamond fv(S, T) \quad vld_B(F[\![E]\!]) \Rightarrow (\forall x \cdot F[\![S]\!](x) \Rightarrow F[\![T]\!](x))}{E \vdash S <: T}$$

Other functions that are assumed include:

1. $E \vdash S <: T$ is a subtyping judgment that asserts that type S is a subtype of T. Any algorithm that soundly approximates this relation can be used.

2. $T.1 \ell S$ takes a D entity type T and returns S the type of the field $\leadsto$. Any algorithm that soundly approximates this function can be used.

3. $T.\text{Items} \leadsto S$ takes a D collection type T and returns S, the type of the items. Again, any algorithm that soundly approximates this function can be used.

4. $S + T \leadsto U$ takes two D collection types S and T and returns the type U representing the union of the two collection types. Any algorithm that soundly approximates this function can be used.

The following are the type system rules for type synthesis of expressions, the second judgment form:

(Synth Var)

$$\frac{E, x: T, E' \vdash \diamond}{E, x: T, E' \vdash x \rightarrow T}$$

(Synth Logical 1)

$$\frac{E \vdash \diamond}{E \vdash \text{true} \rightarrow [\text{true}]}$$

(Synth Logical 2)

$$\frac{E \vdash \diamond}{E \vdash \text{false} \rightarrow [\text{false}]}$$

(Synth Integer)

$$\frac{E \vdash \diamond}{E \vdash i \rightarrow [i]}$$

(Synth Text)

$$\frac{E \vdash \diamond}{E \vdash s \rightarrow [s]}$$

(Synth Null)

$$\frac{E \vdash \diamond}{E \vdash \text{null} \rightarrow [\text{null}]} E \vdash \diamond$$

(Synth Cond)

$$\frac{E \vdash e1 \leftarrow \text{Logical} \quad E, -:\{x: \text{Any} | e1\} \vdash e2 \rightarrow S \quad E, -:\{x: \text{Any} | e1\} \vdash e3 \rightarrow T}{E \vdash e1?e2: e3 \rightarrow S | T} E \vdash e_1 \leftarrow \text{Logical}$$

(Synth Let)

$$E \vdash e1 \rightarrow T$$

$$\frac{E, x: T \vdash e2 \rightarrow U}{E \vdash \text{let } x = e1 \text{ in } e2 \rightarrow U\{e1/x\}} E \vdash e_1 \rightarrow T$$

$$E, x: T \vdash e_2 \rightarrow U$$

In the rule above the synthesized type S|T denotes the union of the types S and T. The algorithm may implement optimisations at this point to return a more precise type. For example if S and T are both the type Integer, then the algorithm may return simply Integer.

(Synth In)

$$\frac{E \vdash e1 \leftarrow T}{E \vdash e1 \text{ in } T \rightarrow \text{Logical}}$$

(Synth Annot)

$$\frac{E \vdash e \rightarrow S}{E \vdash e: T \rightarrow T} E \vdash e \rightarrow S$$

The rule (Synth Annot) may either check that there is a subtype relationship between the synthesized type S and ascribed type T (in either direction), or insert a runtime type test to check that the expression e does conform to type T, or both.

(*Synth* Entity)

$$\frac{E \vdash e1 \rightarrow T1 \ \ldots \ E \vdash en \rightarrow Tn}{E \vdash \{l1 = e1, \ \ldots \ , \ ln = en\} \rightarrow \{l1: T1\} \ \& \ \ldots \ \&\{ln: Tn\}}$$

(*Synth* Dot)

$$\frac{E \vdash e \rightarrow T \quad T \cdot \leadsto U}{E \vdash e \cdot l \rightarrow U} \quad \frac{E \vdash e \rightarrow T}{}$$

$$T \cdot \leadsto U$$

(*Synth* Unit)

$$\frac{E \vdash e \rightarrow T}{E \vdash \{e\} \rightarrow T*}$$

(*Synth* Zero)

$$\overline{E \vdash \{\} \rightarrow [\{\}]}$$

(*Synth* Bind)

$$E \vdash e1 \rightarrow S$$
$$S \cdot \text{Items} \leadsto T$$
$$E, x: T \vdash e2 \rightarrow U$$
$$E \vdash U <: \text{Any}*$$
$$\frac{x \notin fv(U)}{E \vdash \text{bind} x \leftarrow e1 \ \text{in} \ e2 \rightarrow U} \quad E \vdash e_1 \rightarrow S$$

$$S \cdot \text{Items} \leadsto T$$

(*Synth* Plus)

$$E \vdash e1 \rightarrow S$$
$$E \vdash e2 \rightarrow T$$
$$\frac{S + T \leadsto U}{E \vdash e1 + e2 \rightarrow U}$$

With respect to the type checking rules set forth below, the main rule is for type checking against a refinement type. The rule for type checking refinement types, along with those for checking the Any (top) type and a type variable, are as follows:

(Check Refinement)

$$E \vdash e1 \leftarrow T$$
$$E, x: T \vdash e2 \leftarrow \text{Logical}$$
$$\frac{\text{check\_is\_true}(E, e2[e1/x])}{E \vdash e1 \leftarrow \{x: T \mid e2\}}$$

In the rule (Check Refinement) above we have assumed some auxiliary routine check_is_true to determine whether the expression e2 with instances of the variable x replaced by e1 is logically true. This check may be attempted as part of the type checking processing or at runtime (by inserting the check into the expression) or both.

(Check Any)

$$\frac{E \vdash e \leftarrow T}{E \vdash e \leftarrow \text{Any}}$$

(Check Type Var)

$$E \vdash e \leftarrow T$$
$$\frac{\text{typedef}(X) = T}{E \vdash e \leftarrow X}$$

The rest of the type checking rules are as follows. It is noted that the three rules above (refinement types, Any types, variable types) take precedence over any of the following rules.

(Check Var)

$$\frac{\llbracket E \rrbracket \Vdash \llbracket U \rrbracket x}{E \vdash x \leftarrow U}$$

(Check Logical 1)

$$\frac{E \vdash \diamond}{E \vdash \text{true} \leftarrow \text{Logical}}$$

(Check Logical 2)

$$\frac{E \vdash \diamond}{E \vdash \text{false} \leftarrow \text{Logical}}$$

$$\llbracket E \rrbracket \mid = \llbracket U \rrbracket(x)$$

(Check Integer)

$$\frac{E \vdash \diamond}{E \vdash i \leftarrow \text{Integer}}$$

(Check Text)

$$\frac{E \vdash \diamond}{E \vdash s \leftarrow \text{Text}}$$

(Check *Cond*)

$$E \vdash e1 \leftarrow \text{Logical}$$
$$E, -:\{x:\text{Any} \mid e1\} \vdash e2 \leftarrow S$$
$$\frac{E, -:\{x:\text{Any} \mid e1\} \vdash e3 \leftarrow S}{E \vdash e1 ? e2 : e3 \leftarrow S}$$

(Check Let)

$$E \vdash e1 \rightarrow T$$
$$\frac{E, x: T \vdash e2 \leftarrow U}{E \vdash \text{let} \ x = e1 \ \text{in} \ e2 \leftarrow U}$$

(Check In)

$$E \vdash e1 \rightarrow S$$
$$\frac{E \vdash \text{Logical} <: U}{E \vdash e1 \ \text{in} \ T \rightarrow U}$$

(Check *Annot*)

$$E \vdash e \rightarrow S$$
$$\frac{E \vdash T <: U}{E \vdash e: T \leftarrow U}$$

The rule (Check Annot) may either check that there is a subtype relationship between the synthesized type S and ascribed type T (or either direction), or insert a runtime type test to check that the expression e does conform to type T, or both.

(Check Entity)

$$E \vdash ej \leftarrow Tj$$
$$\frac{1 \leq j \leq n}{E \vdash \{l1 = e1, \ \ldots \ , \ ln = en\} \leftarrow \{lj: Tj\}}$$

-continued (Check Dot)

$$\frac{E \vdash e \leftarrow \{l: U\}}{E \vdash e \cdot l \leftarrow U}$$

(Check Unit)

$$\frac{E \vdash e \leftarrow T}{E \vdash \{e\} \leftarrow T*}$$

(Check Zero)

$$\overline{E \vdash \{\} \leftarrow T*}$$

(Check Bind)

$$E \vdash e1 \rightarrow S$$
$$S \cdot \text{Items} \curvearrowright T$$
$$E, x: T \vdash e2 \leftarrow U$$
$$\frac{E \vdash U <: \text{Any}*}{E \vdash \text{bind } x \leftarrow e1 \text{ in } e2 \leftarrow U}$$

(Check Plus)

$$E \vdash e1 \leftarrow T$$
$$E \vdash e2 \leftarrow T$$
$$\frac{E \vdash T <: \text{Any}*}{E \vdash e1 + e2 \leftarrow T}$$

The following soundness property relates the checking and synthesis relations to the logical semantics of types and expressions.

Theorem 1 If E⊢e←T or E⊢e→T then $\text{vld}_B(F[[E]] \Rightarrow F[[T]]$ (T[[e]])).

A corollary is that if ∅⊢e→T or ∅⊢e←T and e evaluates to a value v, then v is a value of type T. Moreover, since values inhabit their expected types, there can be no run-time type violations. The combination of refinement types (which are types depending on expressions) and type test (which are expressions depending on types) is highly expressive. Defining the semantics of types as logical formulas and semantic subtyping as valid implication, with the typechecker invoking a theorem prover, is also beneficial. Embodiments advantageously check semantic subtyping by invoking an SMT solver based on first order logic. As described herein, a highly expressive combination of refinement types, type test, and semantic subtyping enables powerful mechanisms for validating code statically.

By mechanizing logical semantics within an SMT solver, static, rather than dynamic, checking of type-based constraints is enabled.

Supplemental Context for Type System

Figure 7:
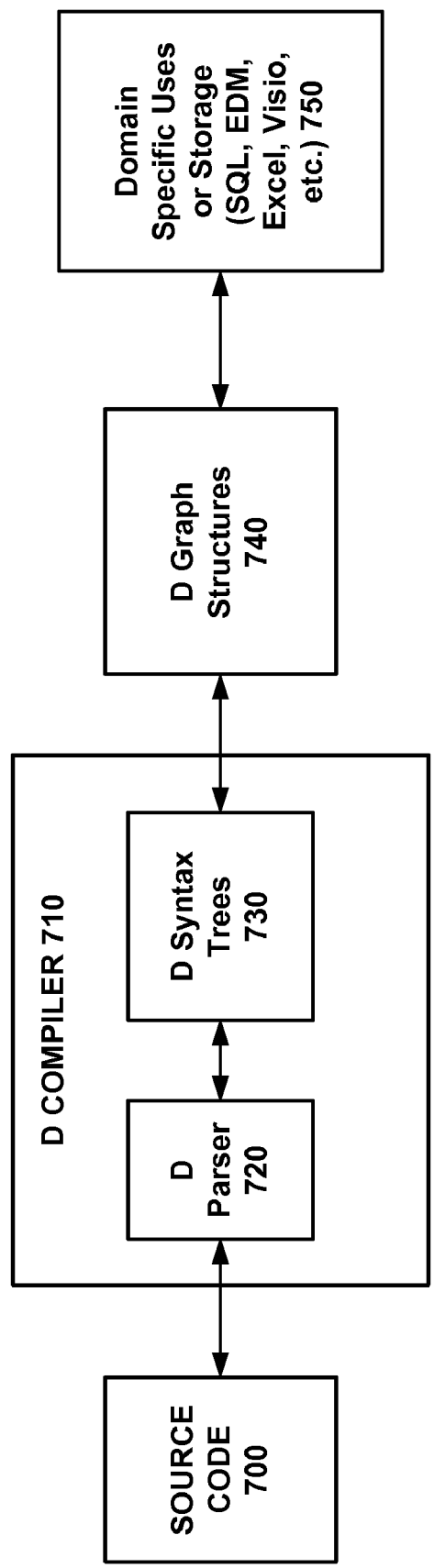
FIG. 7 is a block diagram of a compiling process chain for a declarative programming language and related structures.

For additional understanding, supplemental context regarding the embodiments for a type system of a data scripting language is set forth below, but first some background is presented with reference to FIG. 7 regarding different ways that D programs can be represented and used according to a D compilation chain. For instance, source code 700 can be authored directly by developers, or machines. Source code 700 can be compiled by a D compiler 710 including, for instance, a D parser 720 for parsing source code 700 and a D Syntax Tree component 730 for forming D Syntax Trees, which can then be analyzed and transformed to D Graph structures 740.

D Graph structures 740 can be generated by developers directly, and also by applications, and represented in a compact manner. D Graph structures 740 can be unwound to trees 730 and back to source code 700, and D Graph structures 740 can be compiled or semi-compiled to object code in connection with data intensive applications according to various domain specific uses 750, such as SQL database queries, enterprise data management (EDM), spreadsheet applications, graphics applications, i.e., anywhere that data can be stored and analyzed.

A typed language, such as the D programming language, refers to the notion that the range of values the variables of the language can assume are bounded. An upper bound of such a range is called a type. A type system is a component of a typed language that keeps track of the types of variables and, in general, of the types of all expressions in a program. The types that can be specified and checked in "D" have not been enabled by conventional systems, and such types are described in more detail below.

As mentioned, in various non-limiting embodiments, the present invention provides a type system for a data scripting language that combines refinement types and typecase expressions in the refinement language to enable a simple yet rich type language. In one embodiment, a top type is supported which in combination with refinement types and type test expressions in the refinement language yields further expressivity to the type language. Using this expressive type system, data intensive applications can be statically verified.

Figure 8:
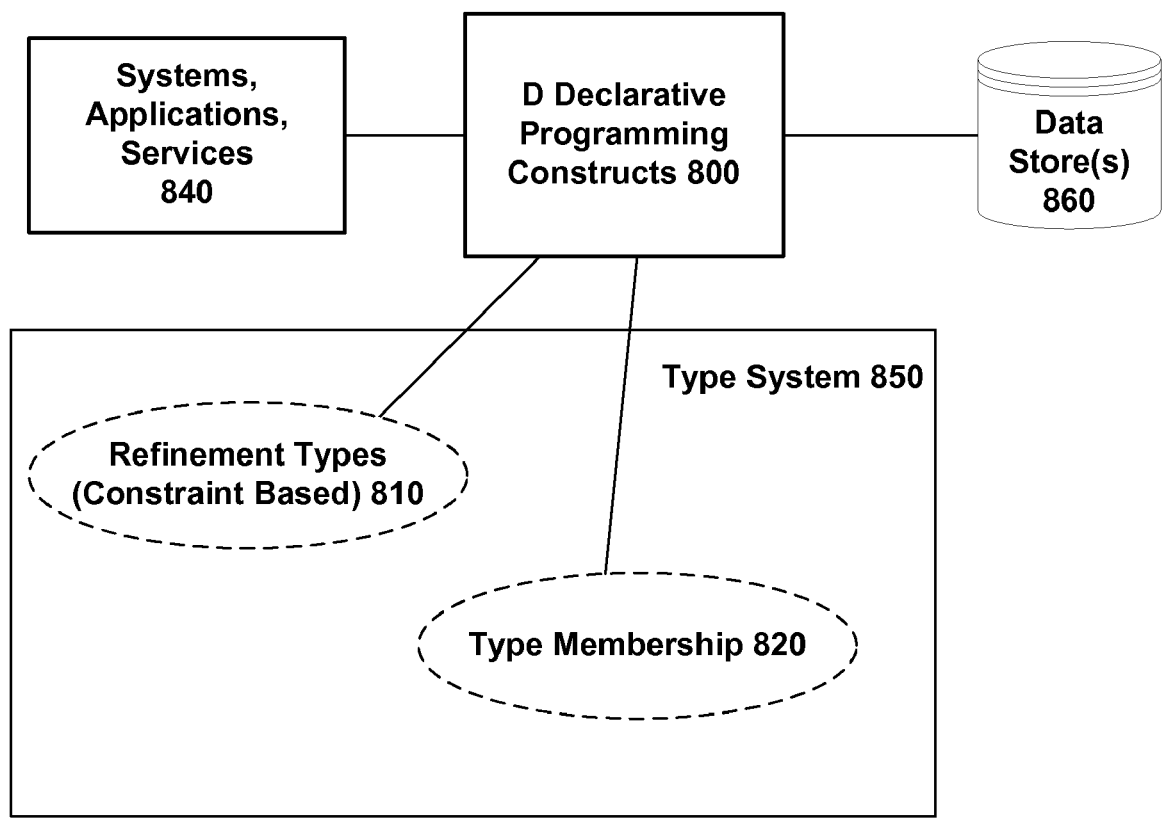
FIG. 8 is a first block diagram illustrating exemplary aspects of a type system in one or more embodiments described herein.

As shown in the block diagram of FIG. 8, in one embodiment, a declarative programming language, such as the D programming language, includes a variety of programming constructs 800 that form part of a program. Systems, applications, services can specify such constructs 800 or execute them as D programs against data store(s) 860 to achieve data intensive results. In one non-limiting aspect, a type system 850 of the programming model underlying the programming constructs 800 includes support for the combination of refinement types 810 and type membership evaluation 820, also known as type test, within an expression of a refinement type 810. In this regard, the combination of refinement types and support for type membership evaluation within the refinement type expression is not supported by conventional systems.

Figure 9:
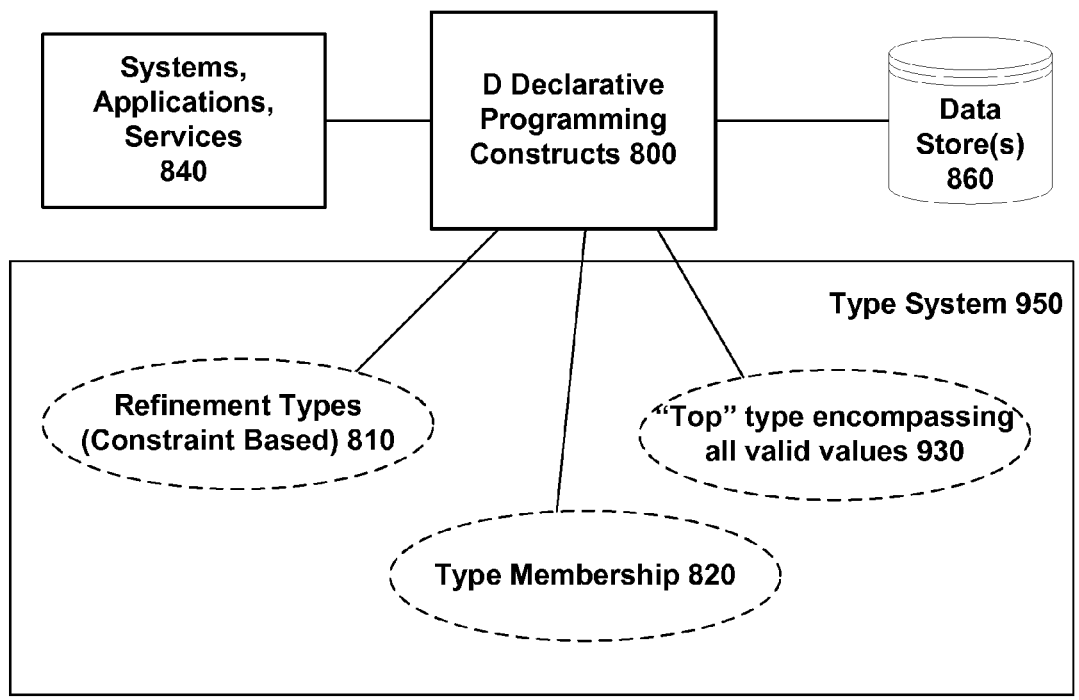
FIG. 9 is second block diagram illustrating exemplary aspects of a type system in one or more embodiments described herein.
Figure 10:
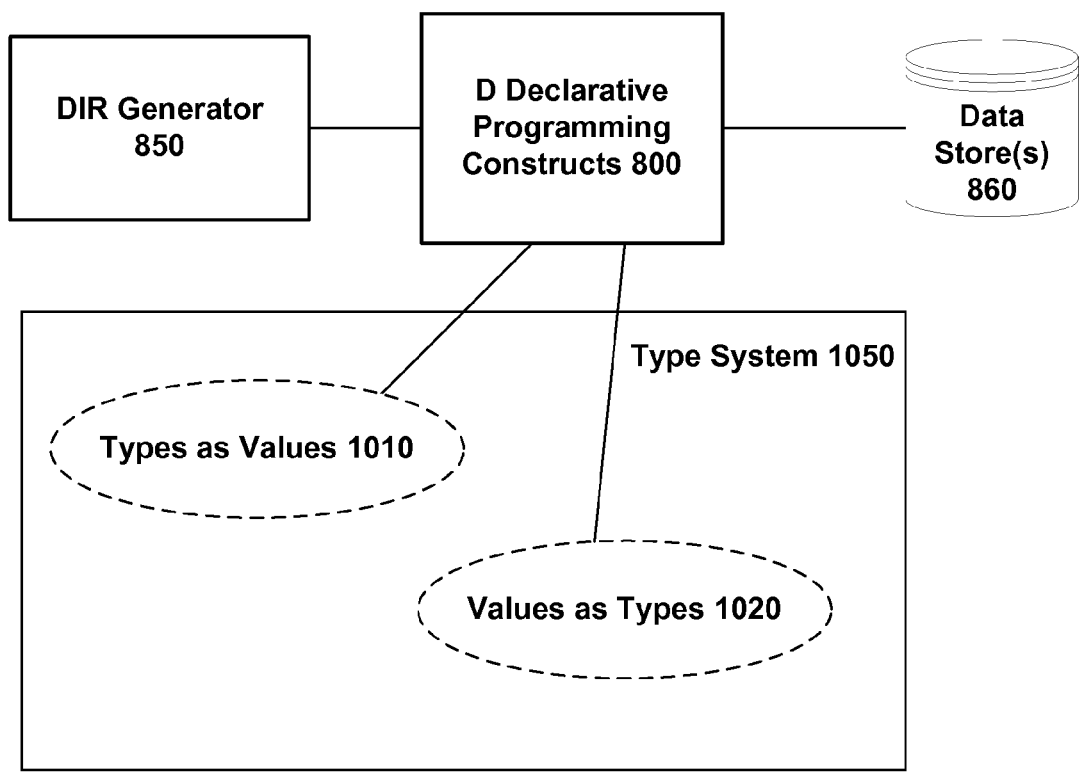
FIG. 10 is third block diagram illustrating exemplary aspects of a type system in one or more embodiments described herein.

As shown in the block diagram of FIG. 9, in addition to the capabilities of type system 250, a type system 950 can also include a top type encompassing all valid values 930. In other words, the top type is the least constrained type of any type found in a programming model having the top type. As shown in the block diagram of FIG. 10, optionally, in addition to the other capabilities, a type system 1050 can further include support for values as types 1020, and also types as values 1010.

Types in "D" include typical primitive types such as Integer, Text, and Logical, along with collection types, written T* (meaning a collection of values of type T), and entity, or record types, written {l1:T1, ..., ln:Tn} (meaning an entity with fields l1, ..., ln of types T1, ..., Tn, respectively).

In one implementation of the above-described type systems for a data scripting language, a type system supports a "top" type, written Any. All valid D values are values of this "least constrained" type. In addition, refinement types are supported, which can be written {value:T|e} where value is an identifier, T is a type and e is a Boolean-valued expression, e.g., "D" syntax for a refinement type is simply "T where e". The values of such a type are the valid "D" values of type T for which the Boolean expression e is equivalent to true.

For example, the value 42 is a member of the type {x:Integer|x>41}, as the value 42 is of type Integer and it satisfies the test x>41 since 42 is indeed greater than 41. For further example, the value 43 is a member of this type as well, but 40 is not. In addition, the type system supports Boolean-valued expressions in refinements. Boolean expression forms of "and" "or", "not", "implies" are supported, and in addition, the type system includes a type membership test, or type test, expression written "e in T". The operational behavior of the type test expression is to evaluate the expression e and determine whether the resulting value is in the set of values of type T.

Figure 11:
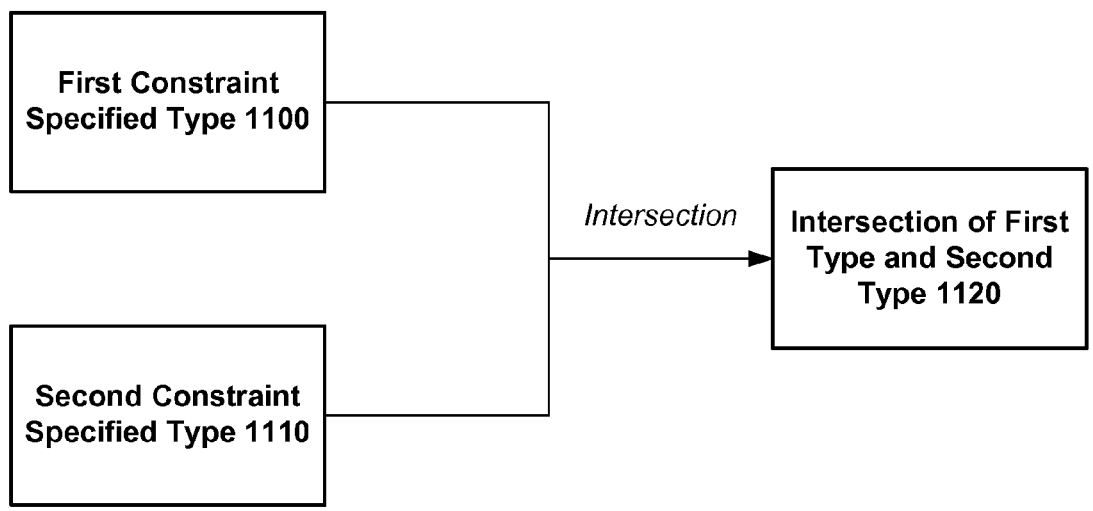
FIG. 11 is a block diagram illustrating a type system capable of intersections of two or more types.

In this regard, combining the above features of a type system yields some powerful and elegant expressions for defining types. For example, FIG. 11 illustrates a first non-limiting benefit, which is that a type 1120 can be defined in a single compact expression that is the intersection of a first type 1100 and a second type 1110, both defined by constraint-based or structural typing. The intersection type of type S and T can be expressed as follows:

{x:Any|x in T && x in S}

Figure 12:
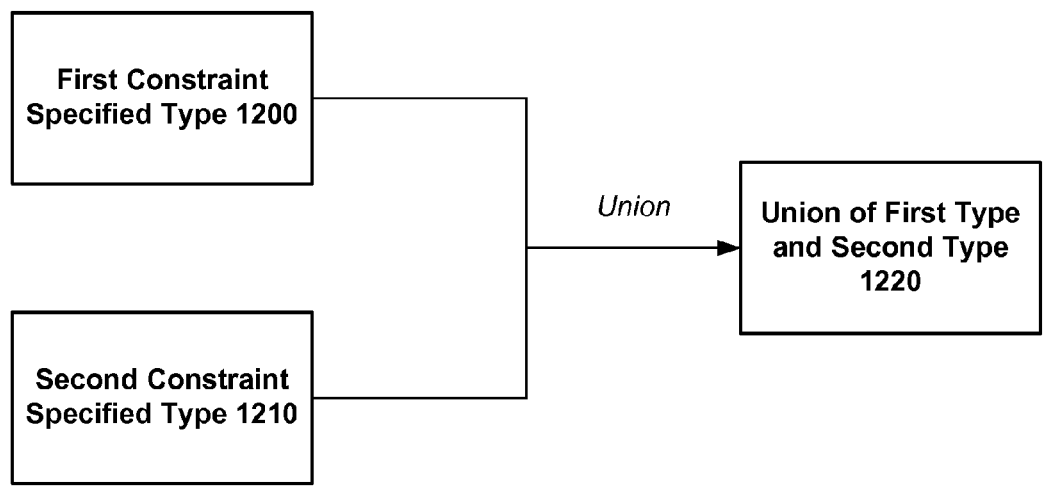
FIG. 12 is a block diagram illustrating a type system capable of joining, or performing a union operation of, two or more types.

FIG. 12 illustrates another non-limiting benefit, namely that a type 1220 can be defined in a single compact expression that is the union of a first type 1200 and a second type 1210, both defined by constraint-based or structural typing. The union type of type S and T can be expressed as follows:

{x:Any|x in T||x in S}

Figure 13:
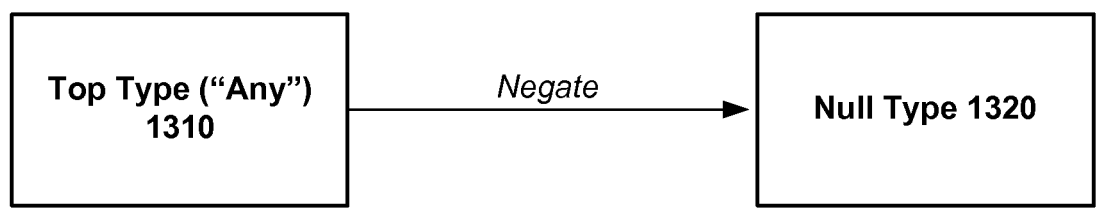
FIG. 13 is a block diagram illustrating a type system whose meaning is the complement of the meaning of an empty type.

Another non-limiting benefit of a type system with a top type, or top level type, is that the empty type can also be expressed as shown in FIG. 13. By negating the top type "Any", an empty type 1320 can be expressed which is the set of no valid types. In D, the empty type can be expressed as follows:

{x:Any|false}

For further understanding, a type system can be described mathematically using a collection of judgments. A judgment is of the following form $$\Gamma \vdash \mathcal{J}$$

where $\mathcal{J}$ is some assertion, the free variables of which are declared in $\Gamma$. The context $\Gamma$ is an ordered list of distinct variables and their types of the form $\emptyset, x1:T1, \ldots, xn:Tn$. (The empty context $\emptyset$ is sometimes dropped.)

The primary judgment form of a type system is a typing judgment which asserts that an expression e has type T in context $\Gamma$, e.g., the free variables of e are defined in $\Gamma$. This can be stated as follows:

$$\Gamma \vdash e:T$$

The assertion e:T, i.e., the assertion that expression e has type T, is a relation. In other words, a given expression may be said to have many types. An expression e is said to be well-typed in context $\Gamma$ if there exists a type T such that $\Gamma \vdash e:T$. A (formal) type system can be specified by giving a set of type rules that define the validity of certain judgments on the basis of other judgments that are assumed to be valid.

Another judgment form is a subtyping judgment that asserts that a type S is a subtype of another type T, and is written as follows.

$$\Gamma \vdash S <: T$$

The type system of the "D" programming language can be formally specified by giving a set of type rules that define such judgments. For example, determining whether a type test expression is well-typed is defined by the following type rule.

$$\frac{\Gamma \vdash e: S}{\Gamma \vdash e \text{ in } T: \text{Logical}}$$

In other words, the expression e in T is well-typed (and of type Logical) in context $\Gamma$ if expression is of some type S.

Another rule allows subtyping to be introduced.

$$\frac{\Gamma \vdash e: S \quad \Gamma \vdash S <: T}{\Gamma \vdash e: T}$$

This rule states that if an expression e is of type S in context $\Gamma$ and, moreover, S is a subtype of T, then expression e is also of type T.

The rule for determining whether an expression is of the type Any is as follows.

$$\frac{\Gamma \vdash e: S}{\Gamma \vdash e: \text{Any}}$$

The rule for determining whether an expression is of a refinement type is as follows.

$$\frac{\Gamma \vdash e1: T\Gamma, \quad x: T \vdash e2: \text{Logical} \quad \text{check\_is\_true}(\Gamma, e2[e1/x])}{\Gamma \vdash e1: \{x: T \mid e2\}}$$

In other words, if expression e1 is of type T in context $\Gamma$, and expression e2 is of type Logical in context (r, x:T), and the Boolean expression e2 with e1 substituted for x can be determined to be logically true (we assume some auxiliary routine check_is_true to determine this fact), then the expression e1 is of type {x:T|e2}. An example of a derivation of a valid judgment is as follows.

$$\frac{\emptyset \vdash 42: \text{Integer } x: \text{Integer} \vdash x > 41: \text{Logical} \quad \text{check\_is\_true}(\emptyset, 42 > 41)}{\emptyset \vdash 42: \{x: \text{Integer} \mid x > 41\}}$$

The auxiliary check (check_is_true) that the refinement expression is satisfied may alternatively not be performed by the type-system but may be inserted into the expression to be checked at runtime.

Accordingly, by implementing a type system as described above, and adhering to the above-described rules and judgments, expressive types can be specified as part of programs that can be statically verified.

Figure 14:
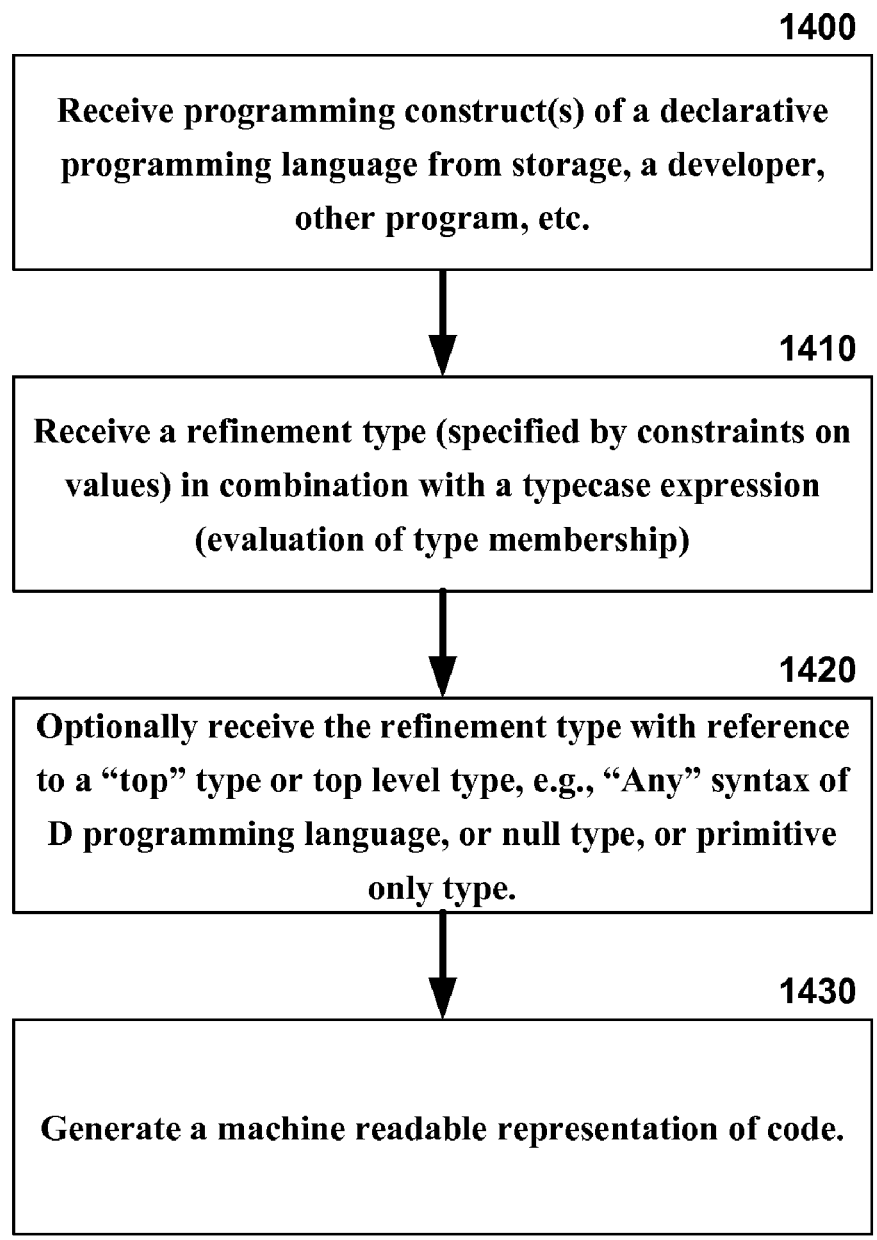
FIG. 14 is a flow diagram illustrating a process for defining declarative code according to a declarative programming model comprising a type system supporting type refinement and type membership in accordance with an embodiment.

FIG. 14 is a flow diagram illustrating a process for defining declarative code according to a declarative programming model comprising a type system supporting type refinement and type membership. At 1400, a specification of programming construct(s) of a declarative programming language is received by a computing system, device, application or service. At 1410, this may include receiving a programming construct specifying a refinement type construct that defines one or more types by specifying values for which a Boolean expression is true. As shown at 1420, this may also include receiving, within the type refinement construct, a specification of a type membership test construct that determines whether one or more resulting values of evaluating an expression is a member of an indicated type. At 1430, a machine readable representation of code can be generated based on the specification of the programming construct(s). Advantageously, the type system enables, but is not limited to enabling, intersection and/or union operations on different types.

Figure 15:
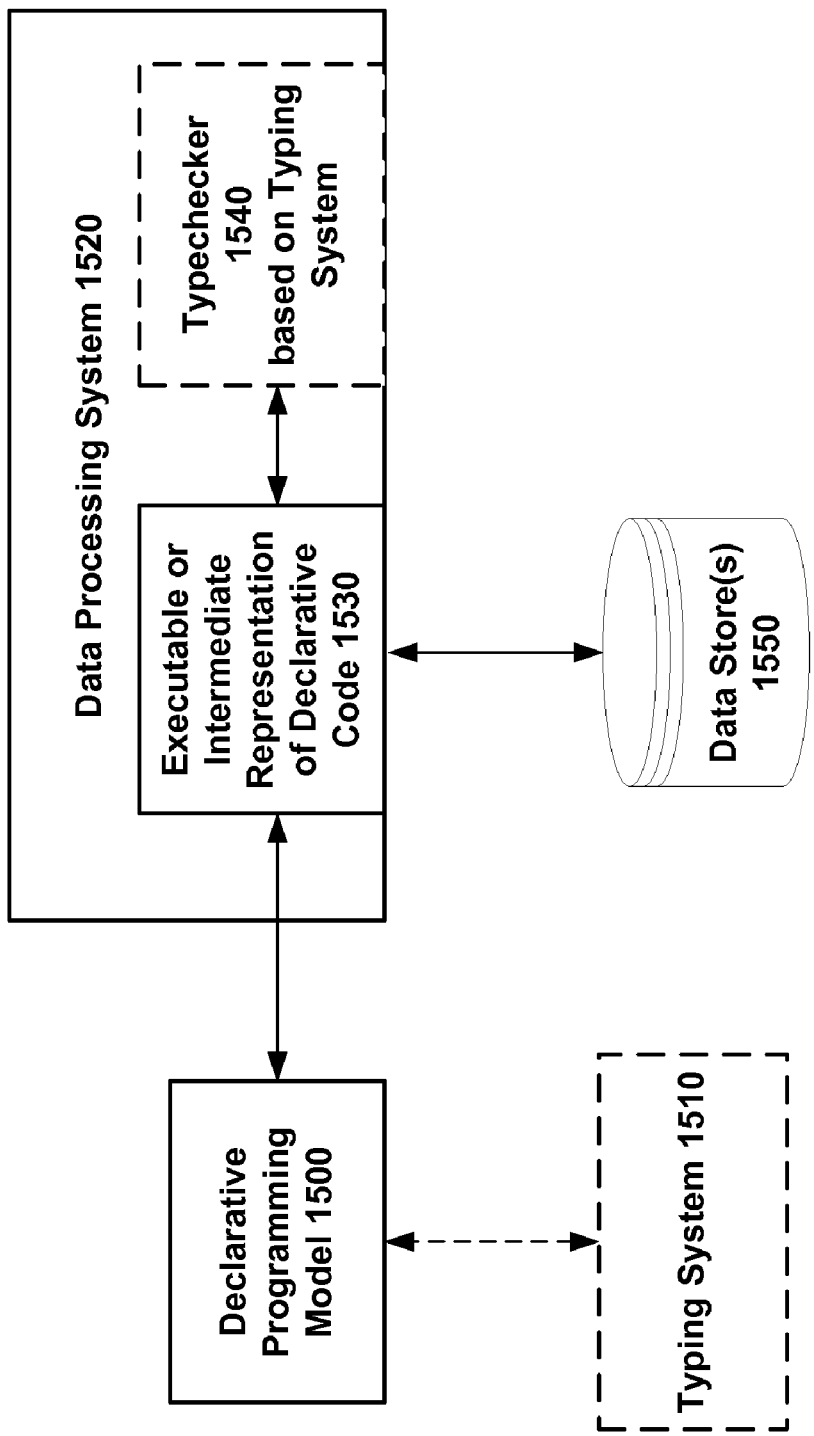
FIG. 15 is a block diagram of a computing system for executing declarative code according to a declarative programming model having a sophisticated type system according to an embodiment.

FIG. 15 is a block diagram of a system including a data processing system 1520 communicatively coupled to data store(s) 1550 for performing data intensive processing with declarative code. In this regard, system 1520 includes declarative code modules that implement a type system 1510 supporting constraint-based type refinement and type membership. The declarative code 1530 is specified according to a declarative programming model 1500 that supports an underlying type system 1510 that supports a refinement type of the type system that defines a type by shaping the type relative to an unlimited top level type representing all types. In addition, the refinement type can include a type test construct that tests an evaluation of an expression for membership of an indicated type. Furthermore, a type checking component 1540 evaluates types of the declarative code to determine an error based on at least one rule that defines the validity of typing of the programming construct. Also, as mentioned, any of the embodiments herein may be in the context of a programming language wherein types can have values and values can have types.

Figure 16:
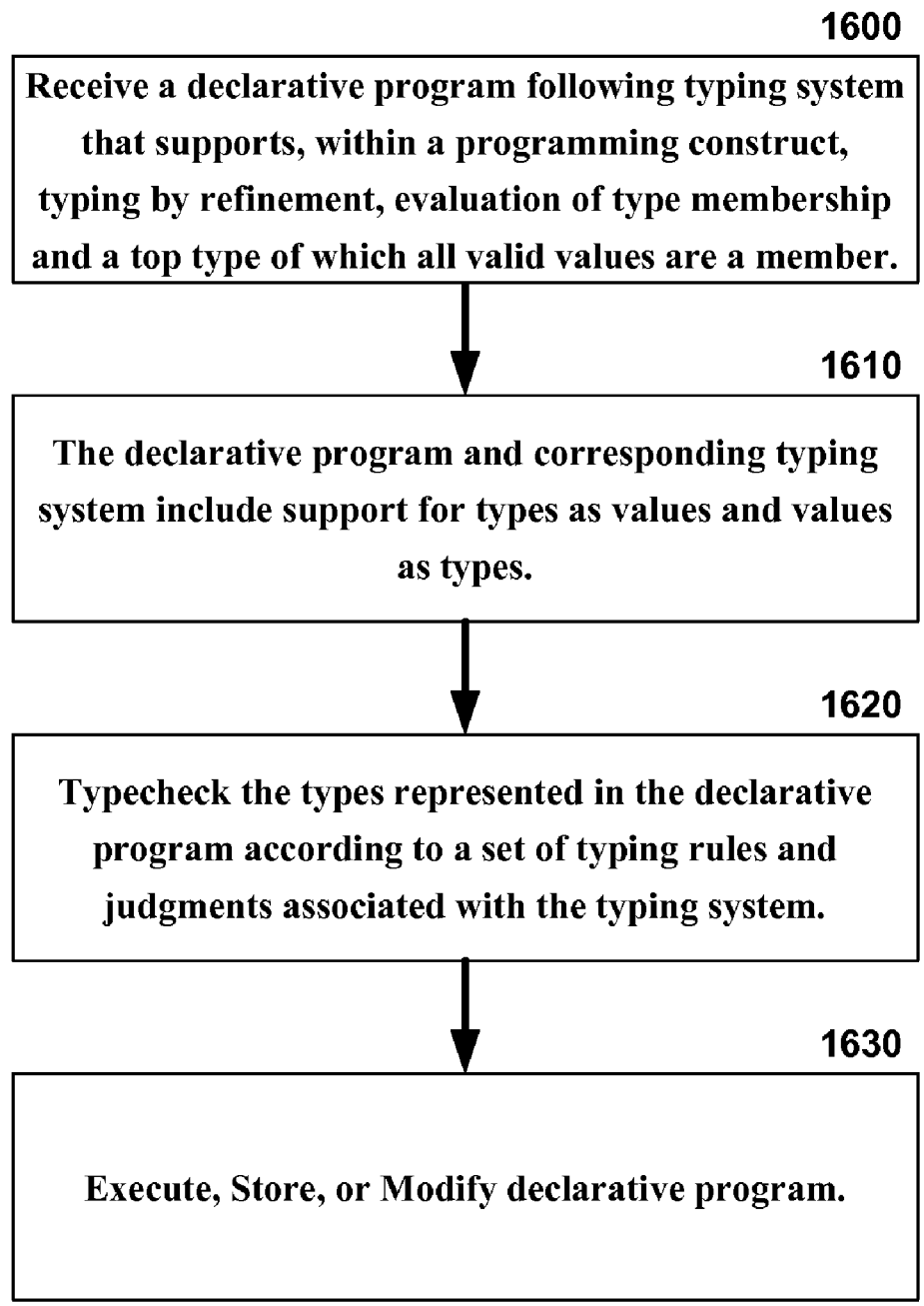
FIG. 16 is a flow diagram illustrating a process for executing declarative code by at least one processor of a computing device according to an embodiment.

FIG. 16 is a flow diagram illustrating a process for executing declarative code by at least one processor of a computing device. At 1600, a declarative program is received, wherein the declarative program is specified according to a type system that supports, within a programming construct of the declarative program, typing by refinement, evaluation of type membership and a top type of which all valid values of the declarative program are a member. At 1610, the declarative program can optionally be specified according to a type system that supports types having values and values having types. At 1620, the types represented in the declarative program are type checked according to a set of typing rules and judgments associated with the type system. At 1630, execution, storage or modification of the declarative program can take place.

Exemplary Declarative Programming Language

For the avoidance of doubt, the additional context provided in this subsection regarding a declarative programming language, such as the D programming language, is to be considered non-exhaustive and non-limiting. The particular example snippets of pseudo-code set forth below are for illustrative and explanatory purposes only, and are not to be considered limiting on the embodiments of the semantic subtyping with transformation to first order logic described above in various detail.

Figure 17:
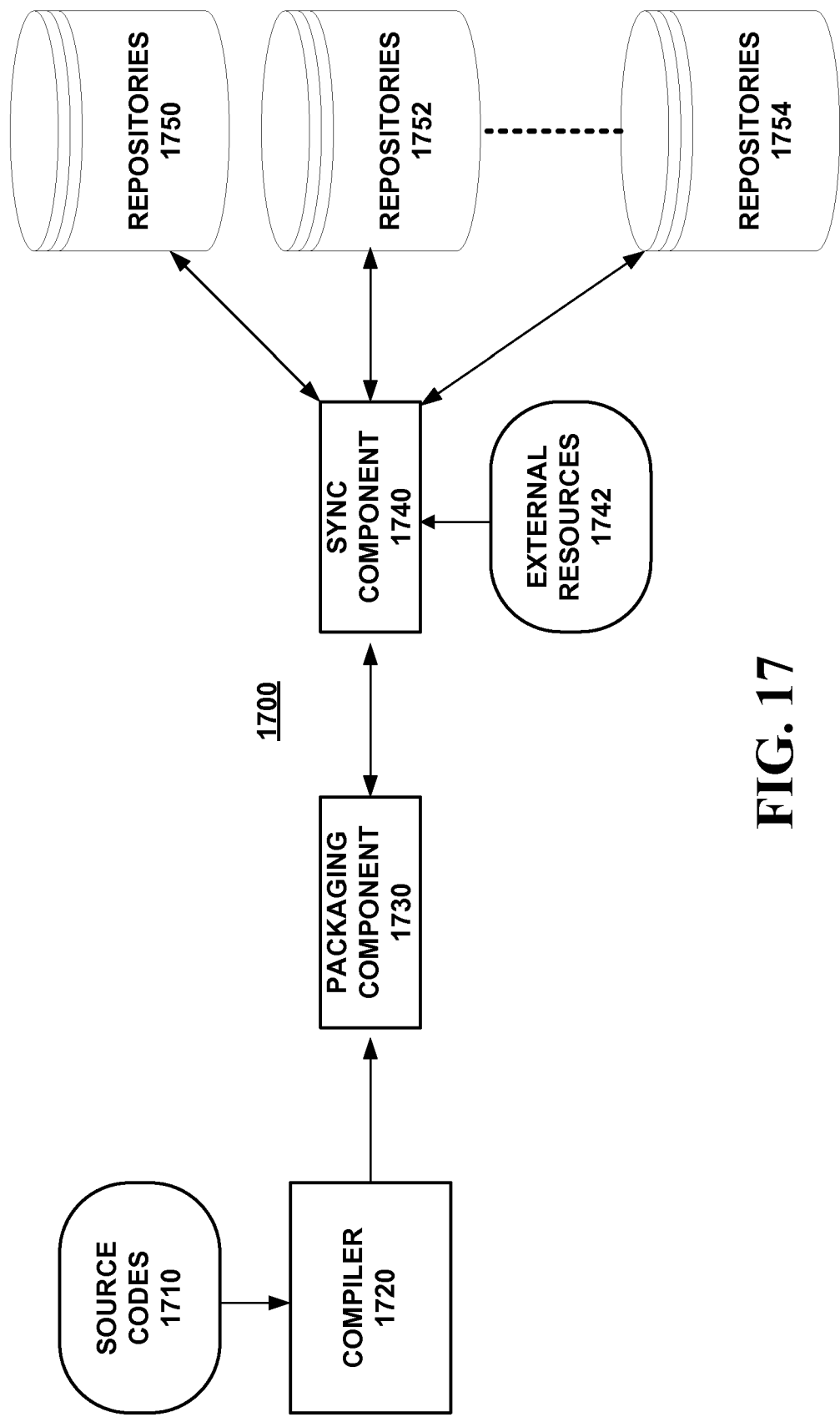
FIG. 17 is an exemplary process chain for a declarative model packaged by an embodiment.

In FIG. 17, an exemplary process chain for a declarative model is provided, such as a model based on the D programming language. As illustrated, process chain 1700 may include a coupling of compiler 1720, packaging component 1730, synchronization component 1740, and a plurality of repositories 1750, 1752, . . . , 1754. Within such embodiment, a source code 1710 input to compiler 1720 represents a declarative execution model authored in a declarative programming language, such as the D programming language. With the D programming language, for instance, the execution model embodied by source code 1710 advantageously follows constraint-based typing, or structural typing, and/or advantageously embodies an order-independent or unordered execution model to simplify the development of code.

Compiler 1720 processes source codes 1710 and can generate a post-processed definition for each source code. Although other systems perform compilation down to an imperative format, the declarative format of the source code, while transformed, is preserved. Packaging component 1730 packages the post-processed definitions as image files, such as D_Image files in the case of the D programming language, which are installable into particular repositories 1750, 1752, . . . , 1754. Image files include definitions of necessary metadata and extensible storage to store multiple transformed artifacts together with their declarative source model. For example, packaging component 1730 may set particular metadata properties and store the declarative source definition together with compiler output artifacts as content parts in an image file.

With the D programming language, the packaging format employed by packaging component 1730 is conformable with the ECMA Open Packaging Conventions (OPC) standards. One of ordinary skill would readily appreciate that this standard intrinsically offers features like compression, grouping, signing, and the like. This standard also defines a public programming model (API), which allows an image file to be manipulated via standard programming tools. For example, in the .NET Framework, the API is defined within the "System.IO.Packaging" namespace.

Synchronization component 1740 is a tool that can be used to manage image files. For example, synchronization component 1740 may take an image file as an input and link it with a set of referenced image files. In between or afterwards, there could be several supporting tools (like re-writers, optimizers, etc.) operating over the image file by extracting packaged artifacts, processing them and adding more artifacts in the same image file. These tools may also manipulate some metadata of the image file to change the state of the image file, e.g., digitally signing an image file to ensure its integrity and security.

Next, a deployment utility deploys the image file and an installation tool installs it into a running execution environment within repositories 1750, 1752, . . . , 1754. Once an image file is deployed, it may be subject to various post deployment tasks including export, discovery, servicing, versioning, uninstall and more. With the D programming language, the packaging format offers support for all these operations while still meeting enterprise-level industry requirements like security, extensibility, scalability and performance. In one embodiment, repositories 1750 can be a collection of relational database management systems (RDBMS), however any storage can be accommodated.

Figure 18:
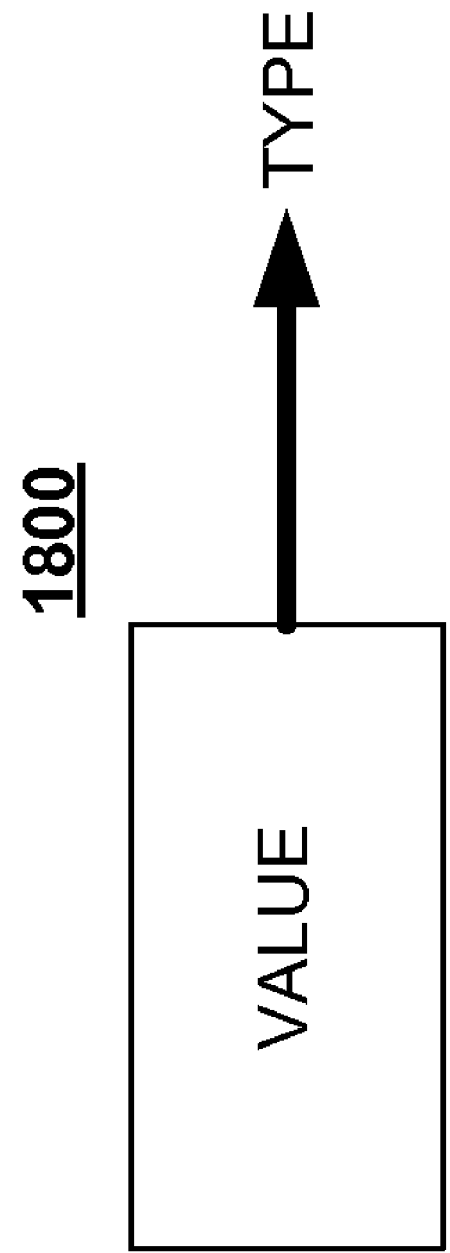
FIG. 18 is an illustration of a type system associated with a record-oriented execution model.
Figure 19:
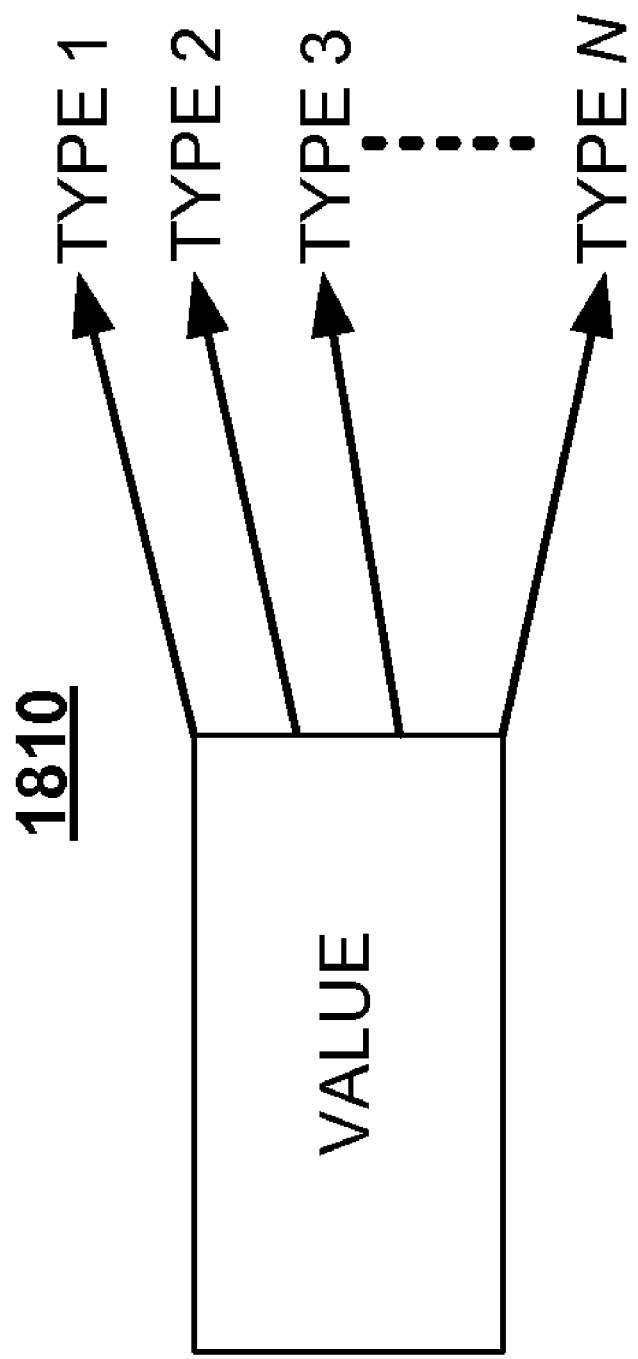
FIG. 19 is a non-limiting illustration of a type system associated with a constraint-based execution model according to an embodiment.

In one embodiment, the methods described herein are operable with a programming language having a constraint-based type system. Such a constraint-based system provides functionality not simply available with traditional, nominal type systems. In FIGS. 18-19, a nominally typed execution system is compared to a constraint-based typed execution system according to an embodiment of the invention. As illustrated, the nominal system 1800 assigns a particular type for every value, whereas values in constraint-based system 1810 may conform with any of an infinite number of types.

For an illustration of the contrast between a nominally-typed execution model and a constraint-based typed model according to a declarative programming language described herein, such as the D programming language, exemplary code for type declarations of each model are compared below.

First, with respect to a nominally-typed execution model the following exemplary C# code is illustrative:

```
class A
{
    public string Bar;
    public int Foo;
}
class B
{
    public string Bar;
    public int Foo;
}
```

For this declaration, a rigid type-value relationship exists in which A and B values are considered incomparable even if the values of their fields, Bar and Foo, are identical. In contrast, with respect to a constraint-based model, the following exemplary D code (discussed in more detail below) is illustrative of how objects can conform to a number of types:

```
type A { Bar : Text; Foo : Integer; }
type B { Bar : Text; Foo : Integer; }
```

For this declaration, the type-value relationship is much more flexible as all values that conform to type A also conform to B, and vice-versa. Moreover, types in a constraint-based model may be layered on top of each other, which provides flexibility that can be useful, e.g., for programming across various RDBMSs. Indeed, because types in a constraint-based model initially include all values in the universe, a particular value is conformable with all types in which the value does not violate a constraint codified in the type's declaration. The set of values conformable with type defined by the declaration type T:Text where value<128 thus includes "all values in the universe" that do not violate the "Integer" constraint or the "value<128" constraint.

Thus, in one embodiment, the programming language of the source code is a purely declarative language that includes a constraint-based type system as described above, such as implemented in the D programming language.

In another embodiment, the method described herein is also operable with a programming language having an order-independent, or unordered, execution model. Similar to the above described constraint-based execution model, such an order-independent execution model provides flexibility that can be useful, e.g., for programming across various RDBMSs.

Figure 20:
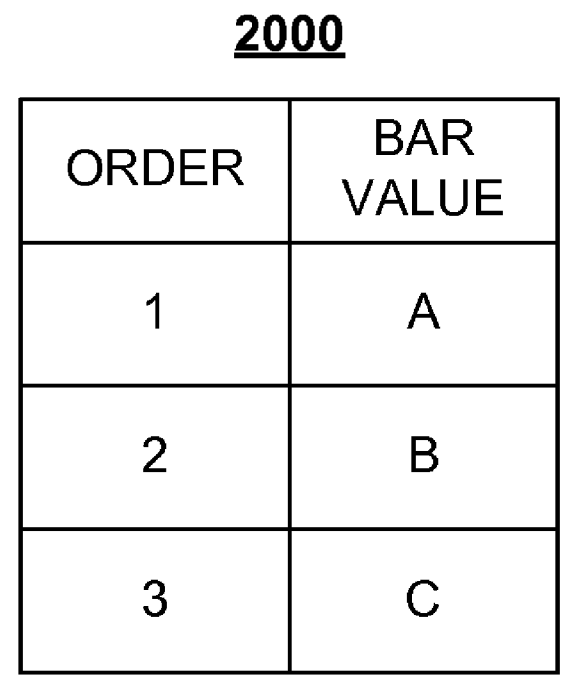
Figure 21:
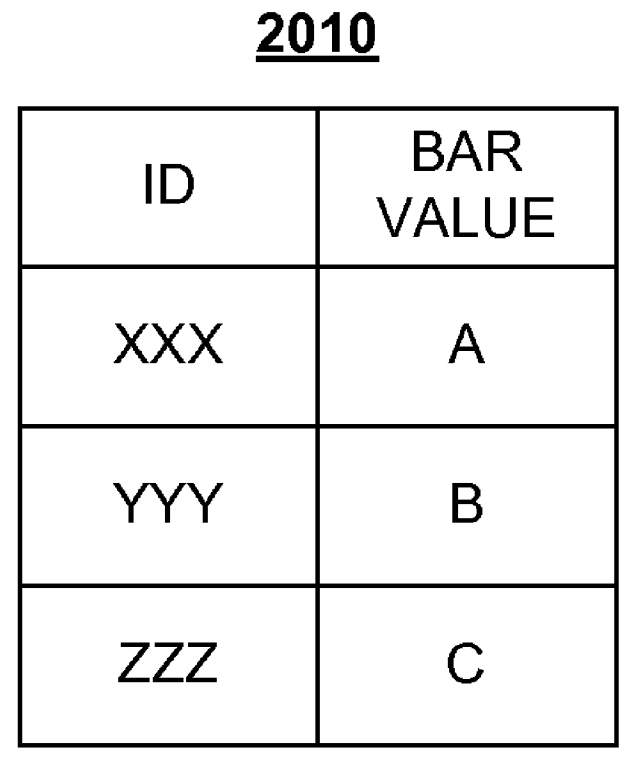

In FIGS. 20-21, for illustrative purposes, a data storage abstraction according to an ordered execution model is compared to a data storage abstraction according to an order-independent execution model. For example, data storage abstraction 2000 of FIG. 20 represents a list Foo created according to an ordered execution model, whereas data abstraction 2010 of FIG. 21 represents a similar list Foo created by an order-independent execution model.

As illustrated, each of data storage abstractions 2000 and 2010 include a set of three Bar values (i.e., "1", "2", and "3"). However, data storage abstraction 2000 requires these Bar values to be entered/listed in a particular order, whereas data storage abstraction 2010 has no such requirement. Instead, data storage abstraction 2010 simply assigns an ID to each Bar value, wherein the order that these Bar values were entered/listed is unobservable to the targeted repository. For instance, data storage abstraction 2010 may have thus resulted from the following order-independent code:

```
f: Foo* = {Bar = "1"};
f: Foo* = {Bar = "2"};
f: Foo* = {Bar = "3"};
```

However, data storage abstraction 2010 may have also resulted from the following code:

```
f: Foo* = {Bar = "3"};
f: Foo* = {Bar = "1"};
f: Foo* = {Bar = "2"};
```

And each of the two codes above are functionally equivalent to the following code:

f: Foo*={{Bar="2"}, {Bar="3"}, {Bar="1"}};

An exemplary declarative language that is compatible with the above described constraint based typing and unordered execution model is the D programming language, sometimes referred to herein as "D" for convenience, which was developed by the assignee of the present invention. However, in addition to D, it is to be understood that other similar declarative programming languages may be used, and that the utility of the invention is not limited to any single programming language, where any one or more of the embodiments of the semantic subtyping with transformation to first order logic described above apply. In this regard, some additional context regarding D is provided below.

As mentioned, D is a declarative language for working with data. D lets users determine how they want to structure and query their data using a convenient textual syntax that is both authorable and readable. In one non-limiting aspect, a D program includes of one or more source files, known formally as compilation units, wherein the source file is an ordered sequence of Unicode characters. Source files typically have a one-to-one correspondence with files in a file system, but this correspondence is not required. For maximal portability, it is recommended that files in a file system be encoded with the UTF-8 encoding.

Conceptually speaking, a D program is compiled using four steps: 1) Lexical analysis, which translates a stream of Unicode input characters into a stream of tokens (Lexical analysis evaluates and executes preprocessing directives); 2) Syntactic analysis, which translates the stream of tokens into an abstract syntax tree; 3) Semantic analysis, which resolves all symbols in the abstract syntax tree, type checks the structure and generates a semantic graph; and 4) Code generation, which generates executable instructions from the semantic graph for some target runtime (e.g. SQL, producing an image). Further tools may link images and load them into a runtime.

As a declarative language, D does not mandate how data is stored or accessed, nor does it mandate a specific implementation technology (in contrast to a domain specific language such as XAML). Rather, D was designed to allow users to write down what they want from their data without having to specify how those desires are met against a given technology or platform. That stated, D in no way prohibits implementations from providing rich declarative or imperative support for controlling how D constructs are represented and executed in a given environment, and thus, enables rich development flexibility.

D builds on three basic concepts: values, types, and extents. These three concepts can be defined as follows: 1) a value is data that conforms to the rules of the D language, 2) a type describes a set of values, and 3) an extent provides dynamic storage for values.

In general, D separates the typing of data from the storage/extent of the data. A given type can be used to describe data from multiple extents as well as to describe the results of a calculation. This allows users to start writing down types first and decide where to put or calculate the corresponding values later.

On the topic of determining where to put values, the D language does not specify how an implementation maps a declared extent to an external store such as an RDBMS. However, D was designed to make such implementations possible and is compatible with the relational model.

With respect to data management, D is a functional language that does not have constructs for changing the contents of an extent, however, D anticipates that the contents of an extent can change via external (to D) stimuli and optionally, D can be modified to provide declarative constructs for updating data.

It is often desirable to write down how to categorize values for the purposes of validation or allocation. In D, values are categorized using types, wherein a D type describes a collection of acceptable or conformant values. Moreover, D types are used to constrain which values may appear in a particular context (e.g., an operand, a storage location).

With a few notable exceptions, D allows types to be used as collections. For example, the "in" operator can be used to test whether a value conforms to a given type, such as:

```
1 in Number
"Hello, world" in Text
```

It should be noted that the names of built-in types are available directly in the D language. New names for types, however, may also be introduced using type declarations. For example, the type declaration below introduces the type name "My Text" as a synonym for the "Text" simple type:

type [My Text]:Text;

With this type name now available, the following code may be written:

"Hello, world" in [My Text]

While it is useful to introduce custom names for an existing type, it is even more useful to apply a predicate to an underlying type, such as:

type SmallText:Text where value.Count<7;

In this example, the universe of possible "Text" values has been constrained to those in which the value contains less than seven characters. Accordingly, the following statements hold true for this type definition:

```
"Terse" in SmallText
!("Verbose" in SmallText)
```

Type declarations compose:

type TinyText:SmallText where value.Count<6;

However, in this example, this declaration is equivalent to the following:

type TinyText:Text where value.Count<6;

It is noted that the name of the type exists so a D declaration or expression can refer to it. Any number of names can be assigned to the same type (e.g., Text where value.Count<7) and a given value either conforms to all of them or to none of them. For example, consider this example:

```
type A : Number where value < 100;
type B : Number where value < 100;
```

Given these two type definitions, both of the following expressions:

```
1 in A
1 in B
``` will evaluate to true. If the following third type is introduced:

type C:Number where value>0;

the following can be stated:

1 in C

A general principle of D is that a given value can conform to any number of types. This is a departure from the way many object-based systems work, in which a value is bound to a specific type at initialization-time and is a member of the finite set of subtypes that were specified when the type was defined.

Another type-related operation that bears discussion is the type ascription operator (:). The type ascription operator asserts that a given value conforms to a specific type.

In general, when values in expressions are seen, D has some notion of the expected type of that value based on the declared result type for the operator/function being applied. For example, the result of the logical and operator (&&) is declared to be conformant with type "Logical."

It is occasionally useful (or even required) to apply additional constraints to a given value—typically to use that value in another context that has differing requirements. For example, consider the following type definition:

type SuperPositive:Number where value>5;

Assuming that there is a function named "CalcIt" that is declared to accept a value of type "SuperPositive" as an operand, it is desirable to allow expressions like this in D:

```
CalcIt(20)
CalcIt(42 + 99)
``` and prohibit expressions like this:

```
CalcIt(-1)
CalcIt(4)
```

In fact, D does exactly what is wanted for these four examples. This is because these expressions express their operands in terms of built-in operators over constants. All of the information needed to determine the validity of the expressions is readily available the moment the D source text for the expression is encountered at little cost.

However, if the expression draws upon dynamic sources of data and/or user-defined functions, the type ascription operator is used to assert that a value will conform to a given type.

To understand how the type ascription operator works with values, a second function, "GetVowelCount," is assumed that is declared to accept an operand of type "Text" and return a value of type "Number" that indicates the number of vowels in the operand.

Since it is unknown based on the declaration of "GetVowelCount" whether its results will be greater than five or not, the following expression is thus not a legal D expression:

CalcIt(GetVowelCount(someTextVariable))

The expression is not legal because the declared result type (Number) of "GetVowelCount" includes values that do not conform to the declared operand type of "CalcIt" (SuperPositive). This expression can be presumed to have been written in error.

However, this expression can be rewritten to the following (legal) expression using the type ascription operator:

CalcIt((GetVowelCount(someTextVariable):SuperPositive))

By this expression, D is informed that there is enough understanding of the "GetVowelCount" function to know that a value that conforms to the type "SuperPositive" will be obtained. In short, the programmer is telling D that he/she knows what D is doing.

However, if the programmer does not know, e.g., if the programmer misjudged how the "GetVowelCount" function works, a particular evaluation may result in a negative number. Because the "CalcIt" function was declared to only accept values that conform to "SuperPositive," the system will ensure that all values passed to it are greater than five. To ensure this constraint is never violated, the system may inject a dynamic constraint test that has a potential to fail when evaluated. This failure will not occur when the D source text is first processed (as was the case with CalcIt(−1))—rather it will occur when the expression is actually evaluated.

In this regard, D implementations typically attempt to report any constraint violations before the first expression in a D document is evaluated. This is called static enforcement and implementations will manifest this much like a syntax error. However, some constraints can only be enforced against live data and therefore require dynamic enforcement.

In this respect, D make it easy for users to write down their intention and put the burden on the D implementation to "make it work." Optionally, to allow a particular D document to be used in diverse environments, a fully featured D implementation can be configurable to reject D documents that rely on dynamic enforcement for correctness in order to reduce the performance and operational costs of dynamic constraint violations.

For further background regard, D, a type constructor can be defined for specifying collection types. The collection type constructor restricts the type and count of elements a collection may contain. All collection types are restrictions over the intrinsic type "Collection," e.g., all collection values conform to the following expressions:

```
{ } in Collection
{ 1, false } in Collection
! ("Hello" in Collection)
```

The last example demonstrates that the collection types do not overlap with the simple types. There is no value that conforms to both a collection type and a simple type.

A collection type constructor specifies both the type of element and the acceptable element count. The element count is typically specified using one of the three operators:

```
T* - zero or more Ts
T+ - one or more Ts
T#m..n - between m and n Ts.
```

The collection type constructors can either use Kleene operators or be written longhand as a constraint over the intrinsic type Collection—that is, the following type declarations describe the same set of collection values:

```
type SomeNumbers : Number+;
type TwoToFourNumbers : Number#2..4;
type ThreeNumbers : Number#3;
type FourOrMoreNumbers : Number#4..;
```

These types describe the same sets of values as these longhand definitions:

```
type SomeNumbers : Collection where value.Count >= 1
                && item in Number;
type TwoToFourNumbers : Collection where value.Count >= 2
                && value.Count <= 4
                && item in Number;
type ThreeNumbers : Collection where value.Count == 3
                && item in Number;
type FourOrMoreNumbers : Collection where value.Count >= 4
                && item in Number;
```

Independent of which form is used to declare the types, the following expressions can be stated:

```
!({ } in TwoToFourNumbers)
!({ "One", "Two", "Three" } in TwoToFourNumbers)
{ 1, 2, 3 } in TwoToFourNumbers
{ 1, 2, 3 } in ThreeNumbers
{ 1, 2, 3, 4, 5 } in FourOrMoreNumbers
```

The collection type constructors compose with the "where" operator, allowing the following type check to succeed:

{1,2} in (Number where value<3)*where value.Count % 2-0

It is noted that the inner "where" operator applies to elements of the collection, and the outer "where" operator applies to the collection itself.

Just as collection type constructors can be used to specify what kinds of collections are valid in a given context, the same can be done for entities using entity types.

In this regard, an entity type declares the expected members for a set of entity values. The members of an entity type can be declared either as fields or as calculated values. The value of a field is stored; the value of a calculated value is computed. Entity types are restrictions over the Entity type, which is defined in the D standard library.

The following is a simple entity type:

type MyEntity:Language.Entity;

The type "MyEntity" does not declare any fields. In D, entity types are open in that entity values that conform to the type may contain fields whose names are not declared in the type. Thus, the following type test:

{X=100,Y=200} in MyEntity will evaluate to true, as the "MyEntity" type says nothing about fields named X and Y.

Entity types can contain one or more field declarations. At a minimum, a field declaration states the name of the expected field, e.g.:

type Point {X; Y;}

This type definition describes the set of entities that contain at least fields named X and Y irrespective of the values of those fields, which means that the following type tests evaluate to true:

```
{ X = 100, Y = 200 } in Point
{ X = 100, Y = 200, Z = 300 } in Point // more fields than expected OK
! ({ X = 100 } in Point)        // not enough fields - not OK
{ X = true, Y = "Hello, world" } in Point
```

The last example demonstrates that the "Point" type does not constrain the values of the X and Y fields, i.e., any value is allowed. A new type that constrains the values of X and Y to numeric values is illustrated as follows:

```
type NumericPoint {
    X : Number;
    Y : Number where value > 0;
}
```

It is noted that type ascription syntax is used to assert that the value of the X and Y fields should conform to the type "Number." With this in place, the following expressions evaluate to true:

```
{ X = 100, Y = 200 } in NumericPoint
{ X = 100, Y = 200, Z = 300 } in NumericPoint
! ({ X = true, Y = "Hello, world" } in NumericPoint)
! ({X = 0, Y = 0 } in NumericPoint)
```

As was seen in the discussion of simple types, the name of the type exists so that D declarations and expressions can refer to it. That is why both of the following type tests succeed:

```
{ X = 100, Y = 200 } in NumericPoint
{ X = 100, Y = 200 } in Point
``` even though the definitions of NumericPoint and Point are independent.

Fields in D are named units of storage that hold values. D allows the developer to initialize the value of a field as part of an entity initializer. However, D does not specify any mechanism for changing the value of a field once it is initialized. In D, it is assumed that any changes to field values happen outside the scope of D.

A field declaration can indicate that there is a default value for the field. Field declarations that have a default value do not require conformant entities to have a corresponding field specified (such field declarations are sometimes called optional fields). For example, with respect to the following type definition:

```
type Point3d {
    X : Number;
    Y : Number;
    Z = −1 : Number; // default value of negative one
}
```

Since the Z field has a default value, the following type test will succeed:

{X=100, Y=200} in Point3d

Moreover, if a type ascription operator is applied to the value as follows:

{X=100, Y=200}:Point3d)

then the Z field can be accessed as follows:

({X=100, Y=200}: Point3d).Z in which case this expression will yield the value −1.

In another non-limiting aspect, if a field declaration does not have a corresponding default value, conformant entities must specify a value for that field. Default values are typically written down using the explicit syntax shown for the Z field of "Point3d." If the type of a field is either nullable or a zero-to-many collection, then there is an implicit default value for the declaring field of null for optional and {} for the collection.

For example, considering the following type:

```
type PointND {
    X : Number;
    Y : Number;
    Z : Number?;       // Z is optional
    BeyondZ : Number*; // BeyondZ is optional too
}
```

Then, again, the following type test will succeed:

{X=100, Y=200} in PointND and ascribing the "PointND" to the value yields these defaults:

```
({ X = 100, Y = 200 } : PointND).Z == null
({ X = 100, Y = 200 } : PointND).BeyondZ == { }
```

The choice of using a zero-to-one collection vs. an explicit default value to model optional fields typically comes down to one of style.

Calculated values are named expressions whose values are calculated rather than stored. An example of a type that declares such a calculated value is:

```
type PointPlus {
    X : Number;
    Y : Number;
    // a calculated value
    IsHigh( ) : Logical { Y > 0; }
}
```

Note that unlike field declarations, which end in a semicolon, calculated value declarations end with the expression surrounded by braces.

Like field declarations, a calculated value declaration may omit the type ascription, like this example:

```
type PointPlus {
    X : Number;
    Y : Number;
    // a calculated value with no type ascription
    InMagicQuadrant( ) { IsHigh && X > 0; }
    IsHigh( ) : Logical { Y > 0; }
}
```

In another non-limiting aspect, when no type is explicitly ascribed to a calculated value, D can infer the type automatically based on the declared result type of the underlying expression. In this example, because the logical and operator used in the expression was declared as returning a "Logical," the "InMagicQuadrant" calculated value also is ascribed to yield a "Logical" value.

The two calculated values defined and used above did not require any additional information to calculate their results other than the entity value itself. A calculated value may optionally declare a list of named parameters whose actual values must be specified when using the calculated value in an expression. The following is an example of a calculated value that requires parameters:

```
type PointPlus {
    X : Number;
    Y : Number;
    // a calculated value that requires a parameter
    WithinBounds(radius : Number) : Logical {
        X * X + Y * Y <= radius * radius;
    }
    InMagicQuadrant( ) { IsHigh && X > 0; }
    IsHigh( ) : Logical { Y > 0; }
}
```

To use this calculated value in an expression, one provides values for the two parameters as follows:

({X=100, Y=200}: PointPlus).WithinBounds(50)

When calculating the value of "WithinBounds," D binds the value 50 to the symbol radius, which causes the "WithinBounds" calculated value to evaluate to false.

It is noted with D that both calculated values and default values for fields are part of the type definition, not part of the values that conform to the type. For example, considering these three type definitions:

```
type Point {
    X : Number;
    Y : Number;
}
type RichPoint {
    X : Number;
    Y : Number;
    Z = -1 : Number;
    IsHigh( ) : Logical { X < Y; }
}
type WeirdPoint {
    X : Number;
    Y : Number;
    Z = 42 : Number;
    IsHigh( ) : Logical { false; }
}
```

Since RichPoint and WeirdPoint only have two required fields (X and Y), the following can be stated:

```
{ X=1, Y=2 } in RichPoint
{ X=1, Y=2 } in WeirdPoint
```

However, the "IsHigh" calculated value is only available when one of these two types is ascribed to the entity value:

```
({ X=1, Y=2 } : RichPoint).IsHigh == true
({ X=1, Y=2 } : WeirdPoint).IsHigh == false
```

Because the calculated value is purely part of the type and not the value, when the ascription is chained, such as follows:

(({X=1, Y=2}:RichPoint):WeirdPoint).IsHigh==false then, the outer-most ascription determines which function is called.

A similar principle is at play with respect to how default values work. It is again noted the default value is part of the type, not the entity value. Thus, when the following expression is written:

({X=1, Y=2}:RichPoint).Z==-1 the underlying entity value still only contains two field values (1 and 2 for X and Y, respectively). In this regard, where default values differ from calculated values, ascriptions are chained. For example, considering the following expression:

(({X=1, Y=2}:RichPoint):WeirdPoint).Z==-1

Since the "RichPoint" ascription is applied first, the resultant entity has a field named Z having a value of −1; however, there is no storage allocated for the value, i.e., it is part of the type's interpretation of the value. Accordingly, when the "WeirdPoint" ascription is applied, it is applied to the result of the first ascription, which does have a field named Z, so that value is used to specify the value for Z. The default value specified by "WeirdPoint" is thus not needed.

Like all types, a constraint may be applied to an entity type using the "where" operator. Consider the following D type definition:

```
type HighPoint {
    X : Number;
    Y : Number;
} where X < Y;
```

In this example, all values that conform to the type "HighPoint" are guaranteed to have an X value that is less than the Y value. That means that the following expressions:

```
{ X = 100, Y = 200 } in HighPoint
! ({ X = 300, Y = 200 } in HighPoint)
``` both evaluate to true.

Moreover, with respect to the following type definitions:

```
type Point {
    X : Number;
    Y : Number;
}
type Visual {
    Opacity : Number;
}
type VisualPoint {
    DotSize : Number;
} where value in Point && value in Visual;
``` the third type, "VisualPoint," names the set of entity values that have at least the numeric fields X, Y, Opacity, and DotSize.

Since it is a common desire to factor member declarations into smaller pieces that can be composed, D also provides explicit syntax support for factoring. For instance, the "VisualPoint" type definition can be rewritten using that syntax:

```
type VisualPoint : Point, Visual {
    DotSize : Number;
}
```

To be clear, this is shorthand for the long-hand definition above that used a constraint expression. Furthermore, both this shorthand definition and long-hand definition are equivalent to this even longer-hand definition:

```
type VisualPoint = {
    X : Number;
    Y : Number;
    Opacity : Number;
    DotSize : Number;
}
```

Again, the names of the types are just ways to refer to types—the values themselves have no record of the type names used to describe them.

D can also extend LINQ query comprehensions with several features to make authoring simple queries more concise. The keywords, "where" and "select" are available as binary infix operators. Also, indexers are automatically added to strongly typed collections. These features allow common queries to be authored more compactly as illustrated below.

As an example of where as an infix operator, the following query extracts people under 30 from a defined collection of "People":

```
from p in People
where p.Age = 30
select p
```

An equivalent query can be written:

People where value.Age =30

The "where" operator takes a collection on the left and a Boolean expression on the right. The "where" operator introduces a keyword identifier value in to the scope of the Boolean expression that is bound to each member of the collection. The resulting collection contains the members for which the expression is true. Thus, the expression:

Collection where Expression is equivalent to:

```
from value in Collection
where Expression
select value
```

The D compiler adds indexer members on collections with strongly typed elements. For the collection "People," for instance, the compiler might add indexers for "First(Text)," "Last(Text)," and "Age(Number)."

Accordingly, the statement:

Collection.Field (Expression)

is equivalent to:

```
from value in Collection
where Field == Expression
select value
```

"Select" is also available as an infix operator. With respect to the following simple query:

```
from p in People
select p.First + p.Last
``` the "select" expression is computed over each member of the collection and returns the result. Using the infix "select" the query can be written equivalently as:

People select value.First+value.Last

The "select" operator takes a collection on the left and an arbitrary expression on the right. As with "where," "select" introduces the keyword identifier value that ranges over each element in the collection. The "select" operator maps the expression over each element in the collection and returns the result. For another example, the statement:

Collection select Expression is equivalent to the following:

```
from value in Collection
select Expression
```

A trivial use of the "select" operator is to extract a single field:

People select value.First

The compiler adds accessors to the collection so single fields can be extracted directly as "People.First" and "People.Last."

To write a legal D document, all source text appears in the context of a module definition. A module defines a top-level namespace for any type names that are defined. A module also defines a scope for defining extents that will store actual values, as well as calculated values.

The following is a simple example of a module definition:

```
module Geometry {
  // declare a type
  type Point {
    X : Integer; Y : Integer;
  }
  // declare some extents
  Points : Point*;
  Origin : Point;
  // declare a calculated value
  TotalPointCount { Points.Count + 1; }
}
```

In this example, the module defines one type named "Geometry.Point." This type describes what point values will look like, but does not define any locations where those values can be stored.

This example also includes two module-scoped fields (Points and Origin). Module-scoped field declarations are identical in syntax to those used in entity types. However, fields declared in an entity type simply name the potential for storage once an extent has been determined; in contrast, fields declared at module-scope name actual storage that must be mapped by an implementation in order to load and interpret the module.

In addition, modules can refer to declarations in other modules by using an import directive to name the module containing the referenced declarations. For a declaration to be referenced by other modules, the declaration is explicitly exported using an export directive.

For example, considering the following module:

```
module MyModule {
  import HerModule; // declares HerType
  export MyType1;
  export MyExtent1;
  type MyType1 : Logical*;
  type MyType2 : HerType;
  MyExtent1 : Number*;
  MyExtent2 : HerType;
}
```

It is noted that only "MyType1" and "MyExtent1" are visible to other modules, which makes the following definition of "HerModule" legal:

```
module HerModule {
  import MyModule; // declares MyType1 and MyExtent1
  export HerType;
  type HerType : Text where value.Count < 100;
  type Private : Number where !(value in MyExtent1);
  SomeStorage : MyType1;
}
```

As this example shows, modules may have circular dependencies.

The types of the D language are divided into two main categories: intrinsic types and derived types. An intrinsic type is a type that cannot be defined using D language constructs but rather is defined entirely in the D language specification. An intrinsic type may name at most one intrinsic type as its super-type as part of its specification. Values are an instance of exactly one intrinsic type, and conform to the specification of that one intrinsic type and all of its super types.

A derived type is a type whose definition is constructed in D source text using the type constructors that are provided in the language. A derived type is defined as a constraint over another type, which creates an explicit subtyping relationship. Values conform to any number of derived types simply by virtue of satisfying the derived type's constraint. There is no a priori affiliation between a value and a derived type—rather a given value that conforms to a derived type's constraint may be interpreted as that type at will.

D offers a broad range of options in defining types. Any expression which returns a collection can be declared as a type. The type predicates for entities and collections are expressions and fit this form. A type declaration may explicitly enumerate its members or be composed of other types.

Another distinction is between a structurally typed language, like D, and a nominally typed language. A type in D is a specification for a set of values. Two types are the same if the exact same collection of values conforms to both regardless of the name of the types. It is not required that a type be named to be used. A type expression is allowed wherever a type reference is required. Types in D are simply expressions that return collections.

If every value that conforms to type A also conforms to type B, then A is a subtype of B (and B is a super-type of A). Subtyping is transitive, that is, if A is a subtype of B and B is a subtype of C, then A is a subtype of C (and C is a super-type of A). Subtyping is reflexive, that is, A is a (vacuous) subtype of A (and A is a super-type of A).

Types are considered collections of all values that satisfy the type predicate. For that reason, any operation on a collection can be applied to a type and a type can be manipulated with expressions like any other collection value.

D provides two primary means for values to come into existence: calculated values and stored values (a.k.a. fields). Calculated and stored values may occur with both module and entity declarations and are scoped by their container. A computed value is derived from evaluating an expression that is typically defined as part of D source text. In contrast, a field stores a value and the contents of the field may change over time.

Exemplary Networked and Distributed Environments

One of ordinary skill in the art can appreciate that the various embodiments for semantic subtyping with transformation to first order logic described herein can be implemented in connection with any computer or other client or server device, which can be deployed as part of a computer network or in a distributed computing environment, and can be connected to any kind of data store. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may cooperate to perform one or more aspects of any of the various embodiments of the subject disclosure.

Figure 22:
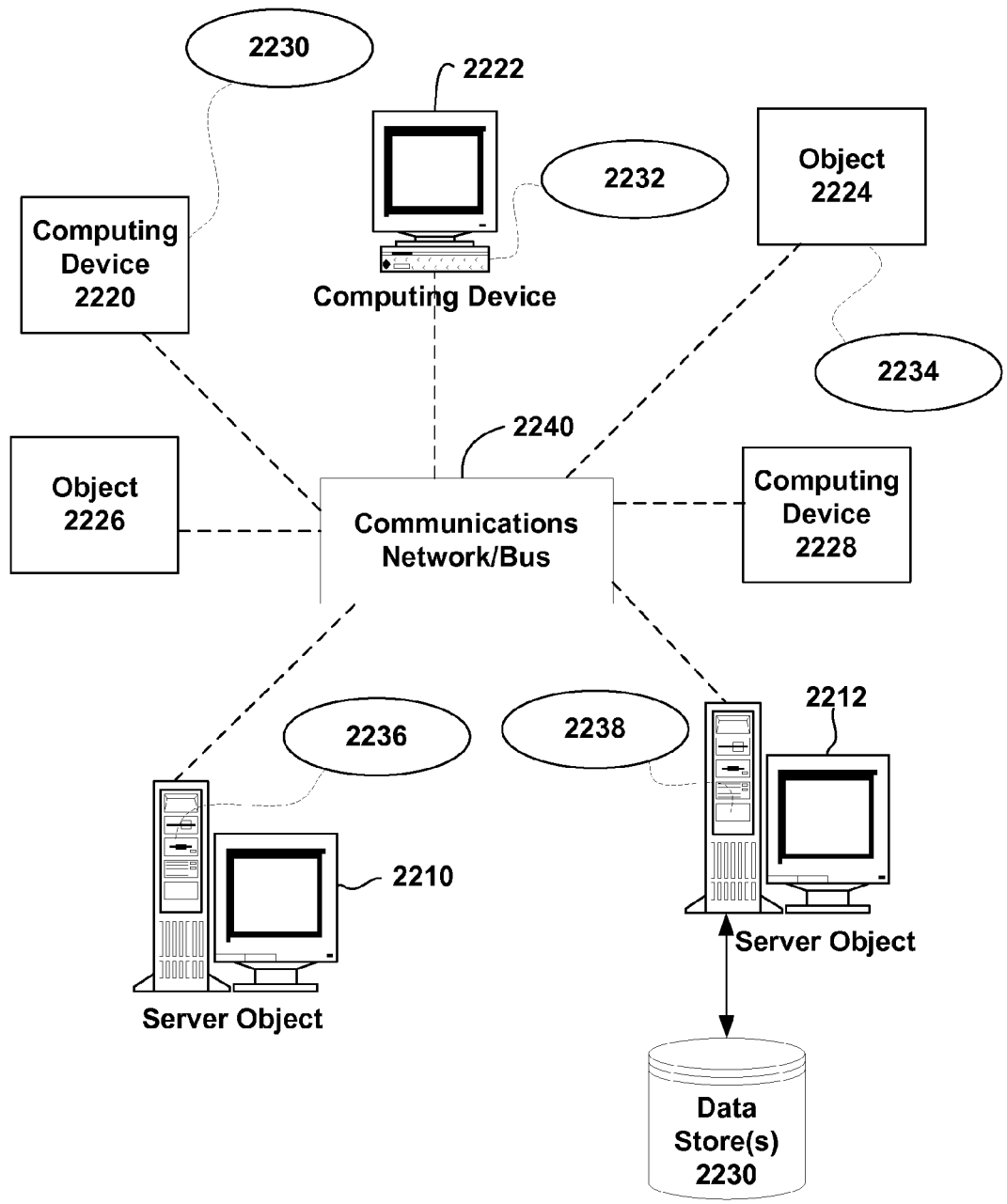
FIG. 22 is a block diagram representing exemplary non-limiting networked environments in which various embodiments described herein can be implemented.

FIG. 22 provides a schematic diagram of an exemplary networked or distributed computing environment. The distributed computing environment comprises computing objects 2210, 2212, etc. and computing objects or devices 2220, 2222, 2224, 2226, 2228, etc., which may include programs, methods, data stores, programmable logic, etc., as represented by applications 2230, 2232, 2234, 2236, 2238. It can be appreciated that objects 2210, 2212, etc. and computing objects or devices 2220, 2222, 2224, 2226, 2228, etc. may comprise different devices, such as PDAs, audio/video devices, mobile phones, MP3 players, personal computers, laptops, etc.

Each object 2210, 2212, etc. and computing objects or devices 2220, 2222, 2224, 2226, 2228, etc. can communicate with one or more other objects 2210, 2212, etc. and computing objects or devices 2220, 2222, 2224, 2226, 2228, etc. by way of the communications network 2240, either directly or indirectly. Even though illustrated as a single element in FIG. 22, network 2240 may comprise other computing objects and computing devices that provide services to the system of FIG. 22, and/or may represent multiple interconnected networks, which are not shown. Each object 2210, 2212, etc. or 2220, 2222, 2224, 2226, 2228, etc. can also contain an application, such as applications 2230, 2232, 2234, 2236, 2238, that might make use of an API, or other object, software, firmware and/or hardware, suitable for communication with, processing for, or implementation of the semantic subtyping with transformation to first order logic provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the semantic subtyping with transformation to first order logic as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 22, as a non-limiting example, computers 2220, 2222, 2224, 2226, 2228, etc. can be thought of as clients and computers 2210, 2212, etc. can be thought of as servers where servers 2210, 2212, etc. provide data services, such as receiving data from client computers 2220, 2222, 2224, 2226, 2228, etc., storing of data, processing of data, transmitting data to client computers 2220, 2222, 2224, 2226, 2228, etc., although any computer can be considered a client, a server, or both, depending on the circumstances. Any of these computing devices may be processing data, encoding data, querying data or requesting services or tasks that may implicate the semantic subtyping with transformation to first order logic as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the semantic subtyping with transformation to first order logic can be provided standalone, or distributed across multiple computing devices or objects.

In a network environment in which the communications network/bus 2240 is the Internet, for example, the servers 2210, 2212, etc. can be Web servers with which the clients 2220, 2222, 2224, 2226, 2228, etc. communicate via any of a number of known protocols, such as the hypertext transfer protocol (HTTP). Servers 2210, 2212, etc. may also serve as clients 2220, 2222, 2224, 2226, 2228, etc., as may be characteristic of a distributed computing environment.

Exemplary Computing Device

As mentioned, advantageously, the techniques described herein can be applied to any device where it is desirable to query large amounts of data quickly. It should be understood, therefore, that handheld, portable and other computing devices and computing objects of all kinds are contemplated for use in connection with the various embodiments, i.e., anywhere that a device may wish to scan or process huge amounts of data for fast and efficient results. Accordingly, the below general purpose remote computer described below in FIG. 24 is but one example of a computing device.

Although not required, embodiments can partly be implemented via an operating system, for use by a developer of services for a device or object, and/or included within application software that operates to perform one or more functional aspects of the various embodiments described herein. Software may be described in the general context of computer-executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol should be considered limiting.

Figure 23:
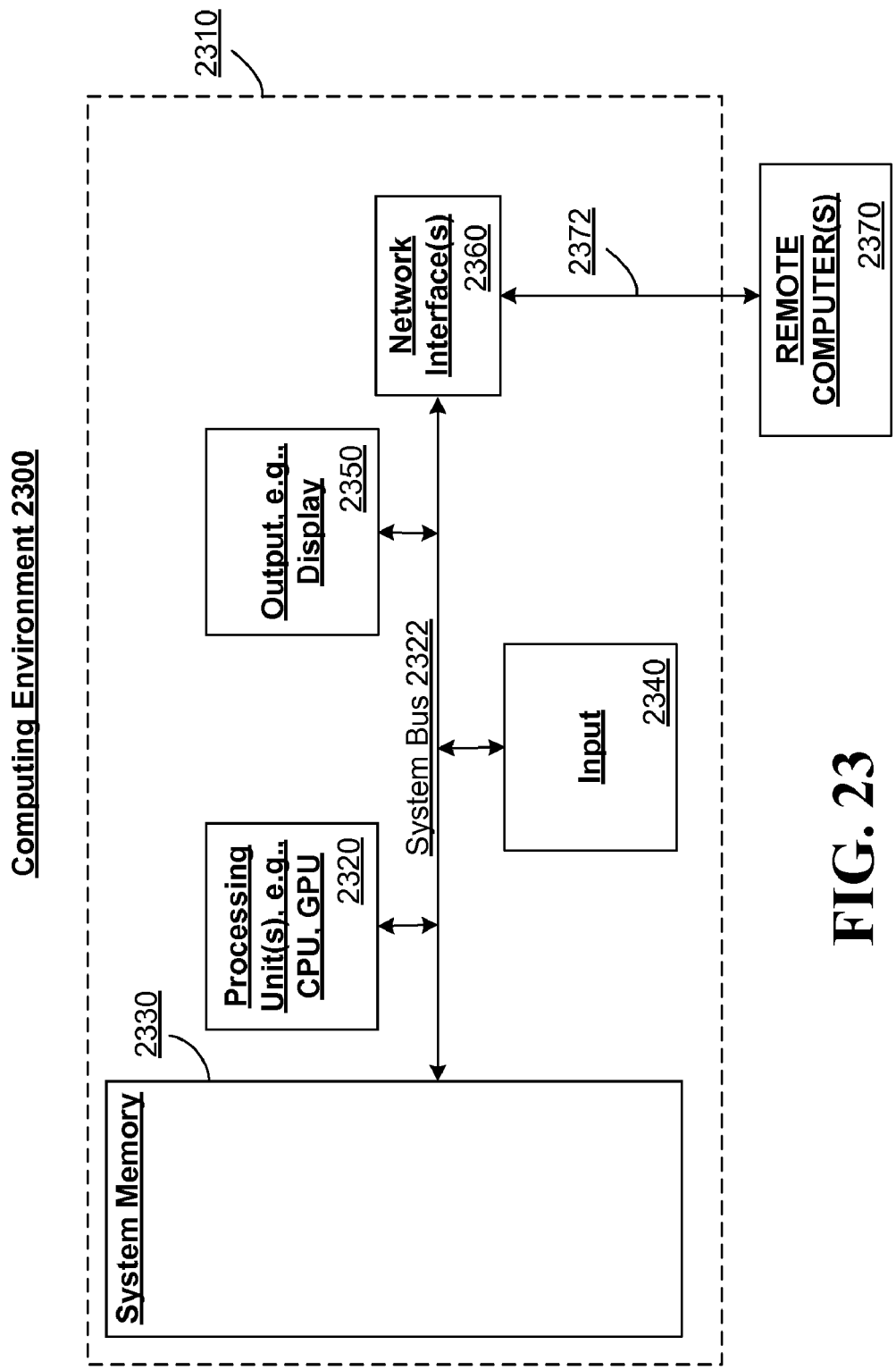
FIG. 23 is a block diagram representing an exemplary non-limiting computing system or operating environment in which one or more aspects of various embodiments described herein can be implemented.

FIG. 23 thus illustrates an example of a suitable computing system environment 2300 in which one or aspects of the embodiments described herein can be implemented, although as made clear above, the computing system environment 2300 is only one example of a suitable computing environment and is not intended to suggest any limitation as to scope of use or functionality. Neither should the computing environment 2300 be interpreted as having any dependency or requirement relating to any one or combination of components illustrated in the exemplary operating environment 2300.

With reference to FIG. 23, an exemplary remote device for implementing one or more embodiments includes a general purpose computing device in the form of a computer 2310. Components of computer 2310 may include, but are not limited to, a processing unit 2320, a system memory 2330, and a system bus 2322 that couples various system components including the system memory to the processing unit 2320.

Computer 2310 typically includes a variety of computer readable media and can be any available media that can be accessed by computer 2310. The system memory 2330 may include computer storage media in the form of volatile and/or nonvolatile memory such as read only memory (ROM) and/or random access memory (RAM). By way of example, and not limitation, memory 2330 may also include an operating system, application programs, other program modules, and program data.

A user can enter commands and information into the computer 2310 through input devices 2340. A monitor or other type of display device is also connected to the system bus 2322 via an interface, such as output interface 2350. In addition to a monitor, computers can also include other peripheral output devices such as speakers and a printer, which may be connected through output interface 2350.

The computer 2310 may operate in a networked or distributed environment using logical connections to one or more other remote computers, such as remote computer 2370. The remote computer 2370 may be a personal computer, a server, a router, a network PC, a peer device or other common network node, or any other remote media consumption or transmission device, and may include any or all of the elements described above relative to the computer 2310. The logical connections depicted in FIG. 23 include a network 2372, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to compress large scale data or process queries over large scale data.

Also, there are multiple ways to implement the same or similar functionality, e.g., an appropriate API, tool kit, driver code, operating system, control, standalone or downloadable software object, etc. which enables applications and services to use the efficient encoding and querying techniques. Thus, embodiments herein are contemplated from the standpoint of an API (or other software object), as well as from a software or hardware object that provides semantic subtyping with transformation to first order logic. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention should not be limited to any single embodiment, but rather should be construed in breadth, spirit and scope in accordance with the appended claims.

What is claimed is:

1. A method for validating at least a portion of a declarative program based on a background theory for a programming language having a type system that supports type test and refinement, including:

for a given environment, translating, by a computing device, a programming construct of the declarative program to at least one first order logic formula construct based on a semantic analysis;

determining, by the computing device, a validity of the at least one first order logic formula construct based on an analysis of the at least one first order logic formula construct; and determining, by the computing device, whether a first type of the programming construct is a valid subtype of a second type of the programming construct based on the validity determination, including:
  forming, for each type T, a formula F[T](x) that is true if and only if x is a value of type T; and
  checking whether a type S is a subtype of the type T through use of a formula of the form ($\forall$x. F[S](x)$\Rightarrow$F[T](x)).

2. The method of claim 1, wherein the determining validity includes inputting the at least one first order logic formula construct to at least one general purpose prover and receiving output from the at least one general purpose prover based on the at least one first order logic formula construct.

3. The method of claim 2, wherein the determining of whether the first type is a subtype of the second type is based on the output from the at least one general purpose prover.

4. The method of claim 2, wherein the receiving includes receiving the output in the form of an answer indicating one of valid, invalid or unknown.

5. The method of claim 2, wherein the inputting includes inputting the at least one first order logic formula construct to at least two general purpose provers and the determining is based on the output of the at least two general purpose provers.

6. The method of claim 2, wherein the inputting includes storing the at least one first order logic formula construct as a text file and submitting the text file to the general purpose prover.

7. The method of claim 2, wherein the inputting of the at least one first order logic formula construct to at least one general purpose prover includes inputting the at least one first order logic formula construct to at least one satisfiability modulo theories (SMT) prover.

8. The method of claim 2, wherein the inputting of the at least one first order logic formula construct to at least one general purpose prover includes inputting the at least one first order logic formula construct in pieces and determining the validity from an aggregate output based on the pieces.

9. The method of claim 1, wherein the determining includes statically determining whether the first type of the programming construct is a valid subtype of the second type prior to executing the declarative program.

10. A volatile or non-volatile computer readable memory having computer executable instructions for carrying out the method of claim 1 stored thereon.

11. A computer system, including:
  a system memory and a processor that are respectively configured to store and execute instructions, including instructions organized into:
    at least one declarative code module comprising computer executable instructions representative of declarative code according to a declarative programming model implementing a type system supporting constraint-based refinement type statements and type test statements in the refinement type statements, the at least one declarative code module including a plurality of programming constructs; and
    a declarative code interpretation module for interpreting and verifying validity of the plurality of constructs according to rules defined based on the type system, wherein the declarative code interpretation module transforms expressions including subtyping relationships to first order logic terms and formulas and invokes at least one prover to test a validity of the first order logic terms and formulas to inform whether the subtyping relationships are valid wherein, for a type T, the declarative code interpretation module forms a formula F[T](x) that holds if and only if x is a value of type T, and wherein the declarative code interpretation module checks whether a type S is a subtype of the type T by generating a formula of the form ($\forall$x. F[S](x)$\Rightarrow$F[T](x)).

12. The computer system of claim 11, wherein the declarative code interpretation module invokes a first-order solver to determine whether the formula is valid, given a background theory based on the type system.

13. The computer system of claim 11, wherein the declarative code interpretation module invokes at least one satisfiability modulo theories (SMT) prover to test the validity of the first order logic terms and formulas.

14. A method for executing declarative code by at least one processor of a computing device, including:
  for execution by the computing device, receiving, by the computing device, a declarative program specified according to a type system that supports, within a programming construct of the declarative program, typing by refinement and evaluation of type membership; and
  determining, by the computing device, the validity of subtyping relationships represented in the declarative program by;
    transforming the expressions to first order or higher order logic expressions; and
    checking the validity of the first order or higher order logic expressions with at least one general purpose prover, including:
      for a type T, forming a formula F[T](x) that holds if and only if x is a value of type T; and
      checking whether a type S is a subtype of the type T by evaluating a formula of the form ($\forall$x. F[S](x)$\Rightarrow$F[T](x)).

15. The method of claim 14, wherein the transforming consists of transforming the expressions to first order expressions and checking the validity of the first order logic expressions with at least one satisfiability modulo theories (SMT) prover.

16. The method of claim 14, wherein the determining includes submitting the first order logic expressions to the general purpose prover in at least two batches and receiving at least two answers from the general purpose prover corresponding to the at least two batches.

17. The method of claim 14, wherein the transforming consists of transforming the expressions to higher than first order logic expressions and checking the validity of the higher order logic expressions with at least one general purpose prover.

18. The method of claim 14, wherein checking the validity of the first order or higher order logic expressions includes:
  inputting the first order or higher order logic expressions into at least two general purpose provers; and
  determining the validity of the first order or higher order logic expressions based on output from the at least two general purpose provers.

19. A volatile or non-volatile computer readable memory having computer executable instructions for carrying out the method of claim 14 stored thereon.

20. The computer system of claim 11, wherein the declarative code interpretation module further invokes at least a second prover to test a validity of the first order logic terms and formulas to determine whether the subtyping relationships are valid.

* * * * *